US010567495B2

(12) United States Patent
Gandhi et al.

(10) Patent No.: US 10,567,495 B2
(45) Date of Patent: Feb. 18, 2020

(54) APPLICATION BASED INTELLIGENT EDGE COMPUTING IN A LOW POWER WIDE AREA NETWORK ENVIRONMENT

(71) Applicant: CISCO TECHNOLOGY, INC., San Jose, CA (US)

(72) Inventors: Indermeet Singh Gandhi, Bangalore (IN); Srinath Gundavelli, San Jose, CA (US); Ramachandra Srinivasa Murthy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 15/353,593

(22) Filed: Nov. 16, 2016

(65) Prior Publication Data
US 2018/0139274 A1 May 17, 2018

(51) Int. Cl.
*G06F 15/173* (2006.01)
*H04L 29/08* (2006.01)
(Continued)

(52) U.S. Cl.
CPC ........ *H04L 67/1046* (2013.01); *H04L 47/803* (2013.01); *H04L 65/104* (2013.01);
(Continued)

(58) Field of Classification Search
CPC ... H04L 67/1046; H04L 12/66; H04L 45/306; H04W 88/16; H04W 4/80
(Continued)

(56) References Cited

U.S. PATENT DOCUMENTS

2011/0070906 A1   3/2011   Chami et al.
2012/0064908 A1   3/2012   Fox et al.
(Continued)

FOREIGN PATENT DOCUMENTS

EP    3258736 A1    12/2017
WO    2016005371 A1    1/2016

OTHER PUBLICATIONS

"3GPP TR 23.707, V13.0.0," 3GPP Organizational Partners, Dec. 2014, 39pages; https://portal.3gpp.org/desktopmodules/Specifications/SpecificationDetails.aspx?specificationId=868.
(Continued)

*Primary Examiner* — Wing F Chan
*Assistant Examiner* — Andrew Woo
(74) *Attorney, Agent, or Firm* — Patterson + Sheridan, LLP

(57) ABSTRACT

Embodiments include technologies for receiving two or more requests to join a network from an end device via two or more gateways, respectively, and selecting one of the two or more gateways for the end device. Embodiments further include sending, to the selected gateway, a response to a request to join the network received via the selected gateway, where the response includes an indication to the selected gateway to forward the request to join the network to an edge network server associated with the selected gateway. In more specific embodiments, an application is identified based on information included in the request to join the network, and a determination is made regarding whether to allocate an edge network server to the end device based, at least in part, on a type of the application. Specific embodiments can include the gateway being selected based, at least in part, on a policy.

19 Claims, 16 Drawing Sheets

(51) Int. Cl.
| | |
|---|---|
| H04W 4/70 | (2018.01) |
| H04W 4/00 | (2018.01) |
| H04W 12/08 | (2009.01) |
| H04L 12/927 | (2013.01) |
| H04L 29/06 | (2006.01) |

(52) U.S. Cl.
CPC ........... *H04L 67/2804* (2013.01); *H04W 4/00* (2013.01); *H04W 4/70* (2018.02); *H04W 12/08* (2013.01); *Y02D 70/00* (2018.01); *Y02D 70/10* (2018.01); *Y02D 70/12* (2018.01); *Y02D 70/122* (2018.01); *Y02D 70/1262* (2018.01); *Y02D 70/14* (2018.01); *Y02D 70/142* (2018.01); *Y02D 70/26* (2018.01)

(58) Field of Classification Search
USPC .................................................. 709/223, 225
See application file for complete search history.

(56) References Cited

U.S. PATENT DOCUMENTS

| | | |
|---|---|---|
| 2013/0029708 A1 | 1/2013 | Fox et al. |
| 2014/0355542 A1* | 12/2014 | Zhang .................. H04W 4/027 370/329 |
| 2015/0024737 A1 | 1/2015 | Fox et al. |
| 2015/0140983 A1 | 5/2015 | Cosimini et al. |
| 2016/0192263 A1 | 6/2016 | Zembutsu et al. |
| 2016/0198349 A1 | 7/2016 | Fox et al. |
| 2016/0249278 A1 | 8/2016 | Qi et al. |
| 2016/0286463 A1 | 9/2016 | Cheng et al. |
| 2017/0163329 A1 | 6/2017 | Dangy-Caye |
| 2017/0366194 A1* | 12/2017 | Sennoun ............. H04W 72/048 |

OTHER PUBLICATIONS

"Executive Summary: Inside 3GPP Release 13: Understanding the Standards for HSPA+ and LTE-Advanced Enhancements," 4G Americas, Sep. 2015, http://www.4gamericas.org/files/3714/4224/8256/Executive_Summary_3GPP_Release_13_final.pdf.

Sornin, N., et al., "LoRaWAN Specification," LoRa Alliance, Inc., Jan. 2015, 82pages; https://www.lora-alliance.org/portals/0/specs/LoRaWAN%20Specification%201R0.pdf.

Anderson, T., "Laying the Foundation for 5G," Cisco Knowledge Network, Nov. 3, 2015, 20 pages; https://www.ciscoknowledgenetwork.com/files/545_11-3-2015- 5G_on_Cisco_Knowledge_Network_v4.pdf?utm_source=&utm_medium=&utm_campaign=&Priority_Code=194542_20.

Notice of Transmittal of the International Search Report and the Written Opinion of the International Searching Authority, or the Declaration for Application No. PCT/US2017/060630 dated Mar. 8, 2018.

"Next Generation Protocols (NGP); Scenarios Definitions", 3GPP Draft; GS NGP001V010101P, 3rd Generation Partnership Project (3GPP), Mobile Competence Centre ; 650, Route des Lucioles ; F-06921 Sophia-Antipolis Cedex ; France 1' Nov. 4, 2016 (Nov. 14, 2016), XP051184862, Retrieved from the Internet: URL:http://www.3gpp.org/ftp/Meetings 3GPP Sync/SA2/Docs/—[retrieved on Nov. 14, 2016] 8.1.4.

Written Opinion of the Internatinal Searching Authority for Application No. PCT/US2017/060630 dated Nov. 16, 2016.

* cited by examiner

APPLICATION BASED INTELLIGENT EDGE COMPUTING IN A LOW POWER WIDE AREA NETWORK ENVIRONMENT

TECHNICAL FIELD

This disclosure relates in general to the field of networking, and more particularly, to application based intelligent edge computing in a low power wide area network environment.

BACKGROUND

The Internet of Things (IoT) involves networks that connect things, such as sensors, embedded devices, switches, machines, and other end devices, to the Internet using radio frequency (RF) communication. The "things" in an IoT network can include any end device (e.g., physical or virtual) that is provisioned with a network address such as an Internet Protocol (IP) address. The end devices can be integrated into any physical object such as cars, traffic lights, mass transportation controls, manufacturing equipment, home appliances, wearable devices, animals, and environmental constructs, for example.

LoRa is a radio frequency technology developed to create low power wide area networks for Internet of Things (IoT) applications. In current LoRa™ architecture, a network server is typically implemented as a centralized function. LoRa™ gateways forward messages from end devices, such as sensors, to the central network server. The central network server can perform media access control (MAC) address termination and can interface with an application server. Significant challenges exist, however, for providing an efficient IoT network with a potentially massive number of "things" that send messages to centralized functions.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Overview

Figure 1:
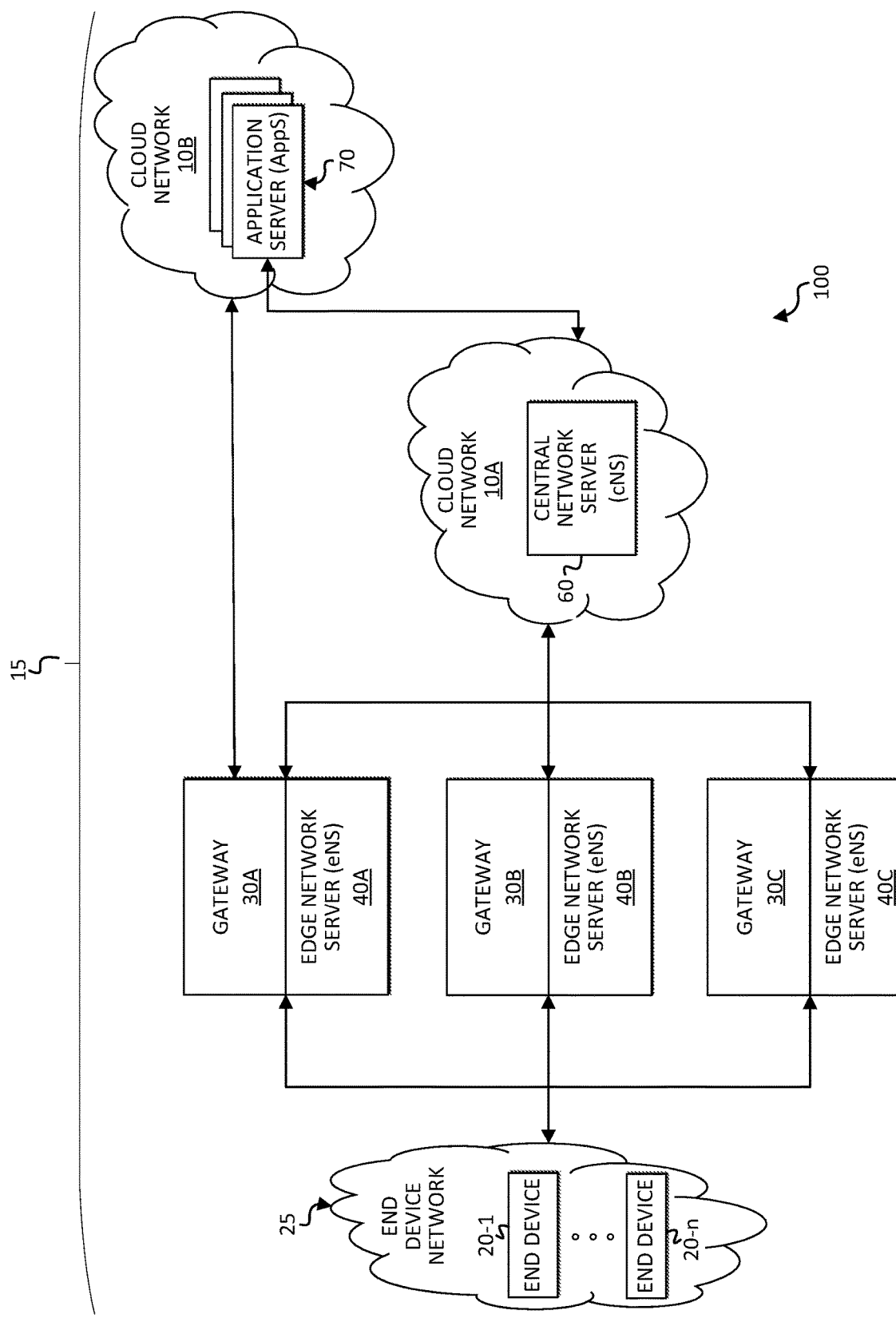
FIG. 1 is a simplified block diagram of a communication system for application based intelligent edge computing in an embodiment of the present disclosure.

The present disclosure describes methods of application based intelligent edge computing in a low power wide area network environment. In one example in the present disclosure, a method includes receiving two or more requests to join a network from an end device via two or more gateways, respectively. The method also includes selecting one of the two or more gateways for the end device and sending, to the selected gateway, a response to a request to join the network received via the selected gateway, wherein the response includes an indication to the selected gateway to forward the request to join the network to an edge network server associated with the selected gateway.

In more specific embodiments, the method includes identifying an application based on information included in the request to join the network and determining whether to allocate an edge network server to the end device based, at least in part, on a type of the identified application. In further specific embodiments, the gateway is selected based, at least in part, on a policy. The method can include identifying an application server for receiving data generated by the end device, where the policy is related to a proximity of the edge network server to the application server.

In more specific embodiments, the method includes designating the selected gateway as a primary gateway for the end device and designating at least one other gateway of the two or more gateways as a secondary gateway for the end device. The embodiment can further include receiving, from the secondary gateway, metadata associated with a message received by the secondary gateway from the end device. The method can further include evaluating at least the metadata received from the secondary gateway to determine whether to change designations of primary gateway and secondary gateway for the end device. The method can further include receiving, at a central network server from the primary gateway, metadata associated with a message received by the primary gateway from the end device. In one example, the message is not received at the central network server.

In yet more specific embodiments, the selected gateway forwards a message from the end device to the edge network server subsequent to receiving the response to the request to join the network. The method can further include generating an extension for the response, the extension to include the indication to the selected gateway to forward the request to join the network to the edge network server. In a more specific embodiment, the edge network server is collocated with the selected gateway.

In another aspect of the present disclosure, a method includes receiving at a gateway to a network, a message from a central network server to accept a request to join the network from an end device, determining whether the message includes an extension, and forwarding the request to join the network to an edge network server based on determining the message includes the extension.

In more specific embodiments, the method can include receiving the request to join the network from an end device, forwarding the request to join the network to the central network server, and storing the request to join the network subsequent to receiving the request. More specific embodiments can include receiving a second message from the end device and forwarding the second message to the edge network server. The second message can contain application data generated by the end device. In further embodiments, the method includes, prior to forwarding the second message to the edge network server, determining that the gateway is designated as a primary gateway for the end device. The method can also include sending metadata associated with the second message to the central network server without sending the second message to the central network server. The edge network server can validate the integrity of the second message prior to sending the second message to the application server. The second message from the end device can be forwarded by the edge network server to an application server associated with the end device. Alternatively, the second message from the end device can be forwarded by the edge network server to a fog application collocated on a network device with the edge network server, and the fog application can perform one or more analytic computations associated with data included in the second message from the end device.

Some or all of the elements, operations, and features may be included in respective systems, apparatuses, and devices for performing the described functionality. Furthermore, some or all of the features may be implemented in at least one machine readable storage medium.

DESCRIPTION

FIG. 1 is a simplified block diagram of a communication system 100 for application based intelligent edge computing in a network environment. FIG. 1 includes an end device network 25 including end devices 20-1 through 20-$n$, a cloud network 10A including a central network server (cNS) 60, and a cloud network 10B including one or more application servers (AppS) 70. Communication system 100 also includes edge devices that facilitate communication between end device network 25 and cloud networks 10A and 10B. In at least one embodiment, edge devices can include pairs of gateways and edge network servers (eNS). For example, communication system 100 includes gateway 30A and eNS 40A, gateway 30B and eNS 40B, and gateway 30C and eNS 40C. In one example, communication system 100 may be implemented based, at least in part, on a LoRa™ network architecture specified in the LoRaWAN™ Specification, LoRa Alliance, N. Sornin, et al., version V1.0, published January 2015. For example, a LoRa wide area network (LoRaWAN) 15 may comprise end device network 25, edge devices 30A-30B and 40A-40B, a backend such as cNS 60, and application servers 70.

Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of a communication system for application based intelligent edge computing, it is important to understand the communications that may be traversing the networks and the protocols used in effecting such communications. The following foundational information may be viewed as a basis from which the present disclosure may be properly explained.

LoRa is a long-range radio frequency technology developed to create low-power wide area networks for Internet of Things (IoT) applications. In current LoRa™ architecture, a network server is typically implemented as a centralized function. LoRa™ gateways (also referred to as concentrators or base stations) forward messages from end devices, such as sensors, to a central network server (cNS). The cNS performs media access control (MAC) address termination for end devices and interfaces with application servers that process data from the end devices. Generally, all data sent from end devices travels via the cNS toward the various application servers. Depending on an end device's configuration, it may produce small amounts of data. A LoRa™ network, however, could potentially support hundreds, thousands, or more end devices. Consequently, the amount of data potentially traversing the network could cause a considerable amount of latency in the network. Furthermore, substantial scaling needs can arise at a cNS due to the potential amount of end device application data. In many deployments of LoRa™ architecture, therefore, there is a need to reduce the path latency. Latency reduction of even a few milliseconds can prove to be significant, particularly for critical events related to some end devices (e.g., smoke alarms, fire alarms, gas leak alarms, etc.).

In a typical LoRa™ architecture where a network server is implemented as a centralized function, attacks can occur at the edge devices of the network. For example, since message integrity checks typically occur at a cNS, the LoRa™ gateways receiving uplink transmissions are forced to forward messages to the cNS without validating the messages. This can result in attacks from malicious entities (e.g., malicious operators, devices, software, etc.) especially given that the edge nodes are in a license free band. Furthermore, additional costs may be incurred if cellular technology (e.g., LTE/3G, etc.) from another service provider is used as backhaul.

Embodiments of a communication system as described herein can resolve the aforementioned issues (and more)

associated with application based intelligent edge computing in a network environment. One or more embodiments disclosed herein can provide an optimal data path for data from end devices to reach application servers in a wide area network, such as LoRaWAN. In at least one embodiment, a network server function, referred to herein as the edge network server (eNS), is either collocated with each edge gateway, or physically or logically provisioned in the network to be closer to each edge gateway. A central network server (cNS) can act as a load-balancer in at least one embodiment. Path latency can be reduced by selecting an optimal gateway on an application basis. The cNS can select a primary gateway and edge network server for an end device attempting to join the network. If gateways overlap, the cNS can select one or more secondary gateways for the end device. Based on the selection of a primary gateway and eNS for a particular end device, application data from that end device can be passed to a cloud application server without traversing the cNS.

Other features and embodiments are also provided. Metadata based on uplink data transmissions can be provided to the cNS from the primary and secondary gateways for mobility, radio resource management (RRM), and location tracking. Mobility support can be provided to an end device by re-selecting primary and secondary gateways based on dynamic metadata. Some embodiments also provide an option of fog computing for application data without compromising on mobility and location tracking capabilities. With fog computing, the amount of data passed to the cloud application server may be minimized to include, for example, only key data (e.g., critical data) and/or delta data.

Several advantages are provided by embodiments disclosed herein. First, embodiments disclosed herein avoid latency for application data due to policy decisions made at a central network server based on information in a message from an end device requesting to join the network. In at least one embodiment, a fog application handles application data and advantageously syncs with an application server when needed based on policy or delta data. Also, at least some embodiments of communication system 100 continue to provide support for RRM, mobility and location tracking while an end device is transmitting its application data. Another advantage includes the validation of messages at the gateways. This can result in improved usage capacity in the license-free spectrum and detection of rogue devices at the gateway itself. Communication system 100 also enables effective use of wireless (e.g., LTE/3G, etc.) backhaul. In addition, in at least some embodiments, analytics on application data (e.g., LoRa end device data) can be provided at the network edge and key data can be passed to the cloud application server without traversing the central network server. Additionally, distributed denial of service (DDoS) attacks can be detected at the edge network servers. Embodiments disclosed herein can also provide support for filtering and blacklisting at the gateway, such that messages from rogue devices can be dropped at the gateway and subsequent messages from those devices can be rejected at the gateway.

Figure 2:
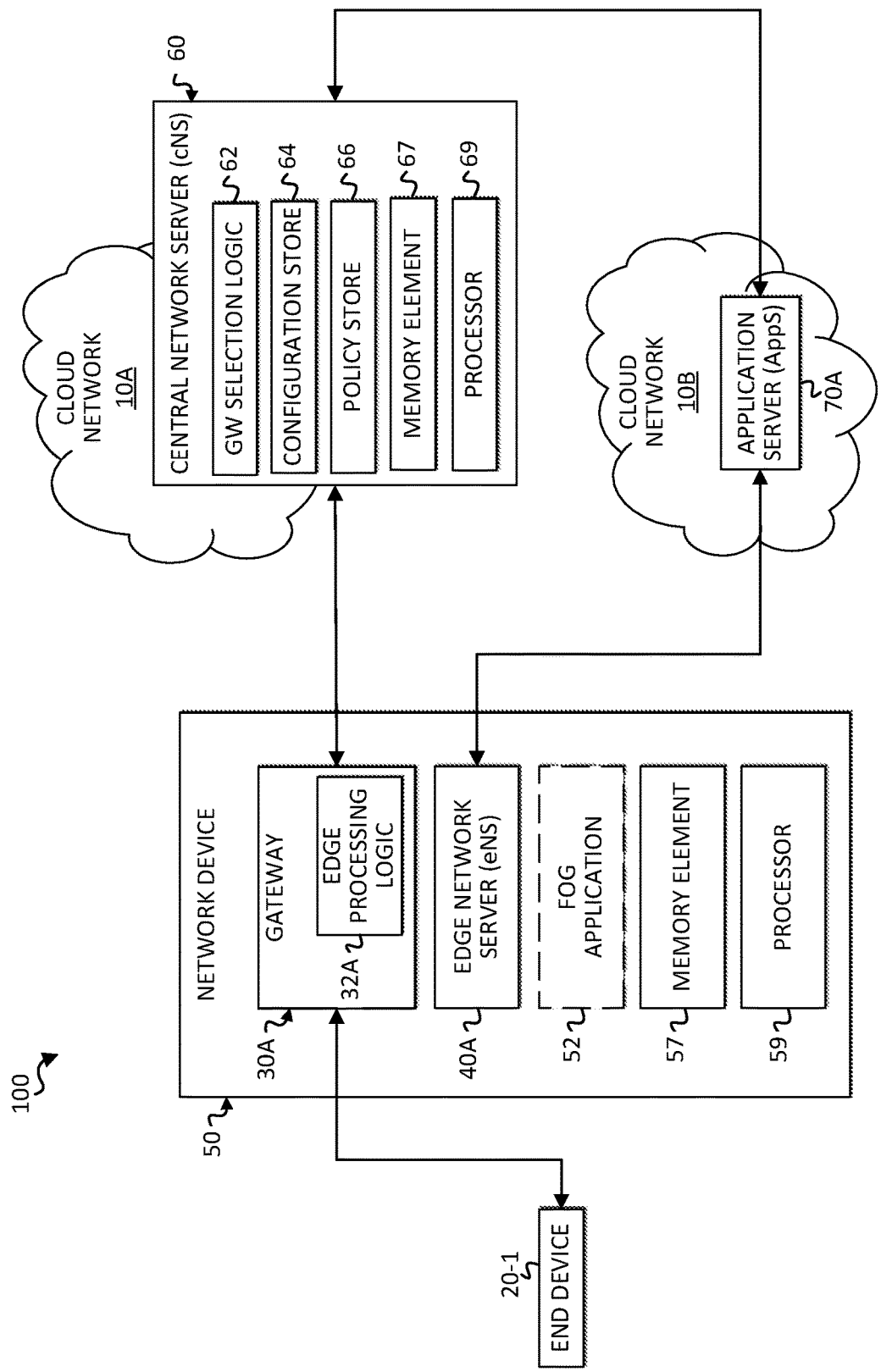
FIG. 2 is a simplified block diagram illustrating additional possible details of the communication system of FIG. 1 according to the present disclosure.

Turning to FIG. 2, FIG. 2 is a simplified block diagram illustrating one possible set of details associated with communication system 100. For ease of illustration, some elements have been omitted from FIG. 2 and to enable illustration of additional possible details. An edge network device 50 can be provisioned with gateway 30A and edge network server 40A, along with a memory element 57 and a processor 59. Gateway 30A can include edge processing logic 32A. A fog application 52 may only be provided in edge network device 50 in certain embodiments in which some of the application server functions are offloaded to be performed by the fog application. Central network server 60 could also include a memory element 67 and a processor 69, along with gateway selection logic 62, a configuration store 64, and a policy store 66. Before discussing potential flows associated with the architectures of FIG. 1-2, a brief discussion is provided about some of the possible infrastructure that may be included in communication system 100.

Generally, communication system 100 can be implemented in any type or topology of networks. In one particular example, communication system 100 is at least partially implemented in a wide area network 15 such as LoRaWAN. Within the context of the disclosure, networks 15, 10A, 10B, and 25, represent a series of points, nodes, and/or network elements of interconnected communication paths for receiving and transmitting packets of information that propagate through communication system 100. These networks offer communicative interfaces between end devices (e.g., sensors), gateways, central network servers, application servers, and other nodes, and may include any local area network (LAN), virtual local area network (VLAN), wide area network (WAN) such as the Internet, LoRa wide area network (LoRaWAN), wireless local area network (WLAN), metropolitan area network (MAN), Intranet, Extranet, virtual private network (VPN), and/or any other appropriate architecture or system that facilitates communications in a network environment or any suitable combination thereof, including wired and/or wireless communication. Additionally, radio signal communications over a cellular network may also be provided in communication system 100. Suitable interfaces and infrastructure may be provided to enable communication with the cellular network.

Communications in communication system 100 may be inclusive of packets that can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Suitable communication messaging protocols may have multiple communication layers, including at least a data link layer and a network layer, which are referred to herein as layer 2 (L2) and layer 3 (L3), respectively. Generally, L2 sets up links across the physical network and transfers data between adjacent nodes using unique physical (i.e., hardware) addresses. In at least one embodiment, these physical addresses (i.e., L2 addresses) can be media access control (MAC) addresses. Generally, L3 is responsible for packet forwarding and routing through intermediate switches/routers/gateways from a source to a destination using network addresses (e.g., IP addresses).

A packet is a formatted unit of data, and can contain both control information (e.g., source network addresses, destination network addresses, source physical addresses, destination physical addresses, source ports, destination ports, etc.) and data, which is also known as payload. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are communications, and therefore, may comprise packets.

End devices 20-1 through 20-$n$ represent any physical or virtual object with a network address (e.g., IP address). Examples of physical objects in which end devices can be implemented include, but are not limited to, cars, traffic lights, mass transportation controls, manufacturing equipment, medical devices, home appliances, wearable devices, animals, environmental constructs, buildings, etc. In some instances, end devices may be provisioned to provide information related to the safety and/or protection of humans, animals, property, and/or the environment. Some end devices may provide data for critical or high priority applications. For example, sensors may be embedded in and/or provide real-time data related to smoke alarms, fire alarms, gas leak alarms, etc.

Gateways 30A-30C, edge network servers 40A-40C, central network server 60, and application servers 70 of communication system 100 are network elements. As used herein, the term 'network element' is meant to encompass any of the aforementioned elements, as well as routers, switches, gateways, bridges, load balancers, service appliances, firewalls, servers, processors, modules (any of which may comprise physical hardware or be virtually implemented on physical hardware) or any other suitable device, component, element, proprietary appliance, or object that is operable to exchange information in a network environment. A network element may include any suitable algorithms, hardware, firmware, software, components, modules, interfaces, or objects that facilitate the operations thereof. This may be inclusive of appropriate algorithms and communication protocols that allow for the effective exchange of data or information.

In at least one example implementation, end devices 20-1 through 20-n, edge network servers 40A-40C, gateways 30A-30C, central network server 60, and application servers 70 represent nodes that enable application based intelligent edge computing capabilities, and include logic to achieve (or to foster) the activities as outlined herein. Note that in at least one example, each of these elements can have an internal structure (e.g., processors, memory elements, network interface cards, etc.) to facilitate some of the operations described herein. In some embodiments, these activities may be executed externally to these elements, or included in some other network element to achieve this intended functionality. In at least one embodiment, these nodes may include logic (or reciprocating logic) that can coordinate with other network elements, clients and/or servers in order to achieve the operations, as outlined herein.

Gateways 30A-30C can be provisioned at the edge of wide area network 15 (e.g., LoRaWAN) and can be configured to relay messages between end devices 20-1 through 20-n and central network server 60 at the backend. Gateways 30A-30C can be configured to facilitate communication between one network (e.g., end device network 25) and another network (e.g., cloud networks 10A and 10B). For example, gateways 30A-30C may communicate with end devices using single hop LoRa or frequency-shift keying (FSK) communications, while communicating with central network server 60 using standard Internet Protocol (IP) connections. In at least one embodiment, each message transmitted by a single end device from end device network 25 may be received by each gateway 30A-30C. The gateways that receive the messages from a particular end device are within a maximum transmission range of the end device. End devices can be static or mobile. Thus, for mobile end devices, the one or more gateways that receive transmissions may change during movement of the end device.

Each gateway may be configured with logic, such as edge processing logic 32A, to process messages from cNS 60 that designate the gateway as a primary gateway for a particular end device and that indicate an eNS associated with the gateway is to be allocated to the end device. The edge processing logic of a primary gateway can then direct application data from the end device to its associated eNS. In addition, the edge processing logic of a gateway can also process messages from cNS 60 that designate the gateway as a secondary gateway for a particular end device. The edge processing logic in a gateway with a primary or secondary designation can forward metadata associated with a message received by the gateway from an end device to the cNS without forwarding the message itself.

Edge network servers 40A-40C can be provisioned at the edge of wide area network 15 (e.g., LoRaWAN) and can each be allocated by cNS 60 to serve one or more end devices. As depicted in FIG. 2, in at least some implementations, an eNS can be collocated with a gateway (e.g., as a virtual machine in network device 50) at the edge of a network. In at least some other implementations, an eNS can be provisioned in a separate network device in closer physical proximity to the gateway at the edge of the network. An eNS, such as edge network servers 40A, can be provisioned with logic to process messages with application data sent to gateway 30A from end device 20-1 and then forwarded to the eNS. The eNS can perform operations to validate the integrity of the message and to forward the message to the appropriate entity (e.g., identified application server 70A or fog application 52).

In at least some embodiments, a fog application, such as fog application 52, can be provisioned to perform at least some functions normally performed by an application server. This can include, for example, analytic computations associated with application data contained in a message from an end device. In at least some embodiments, fog application 52 can differentiate application data such that certain application data is processed by fog application 52 and other application data is communicated to application server 70A to be processed by the application server. For example, certain relevant data (e.g., critical data related to human lives, animal lives, property damage, environmental events, etc.) may need to be processed by application server 70A rather than fog application 52. In another example, delta data may also be communicated to application server 70A. Delta data may include, but is not necessarily limited to, data that deviates from prior application data (or baseline application data) based on a threshold amount.

A fog application may provide several advantages. Fog application 52 can allow close proximity or local computing of a decision point for end device data. This is especially advantageous for static end devices and end devices that generate a significant amount of data on a frequent basis. Thus, compute, storage, and at least some analytics may be provided at the network edge. Fog application 52 can also enable speed, agility, customization and resiliency. Furthermore, fog application 52 can minimize risks of unreliable backhaul connectivity to an application server.

As shown in FIG. 2, fog application 52 can be collocated with eNS 40A and gateway 30A (e.g., as a virtual machine in edge network device 50). In at least some other implementations, fog application 52 can be provisioned in a separate network device with eNS 40A (e.g., as virtual machines) in closer proximity to the gateway at the edge of the network than cNS 60. In yet other implementations, fog application 52 could be separately provisioned in a network device that is in closer proximity to an eNS and its corresponding gateway than cNS 60.

Central network server 60, also referred to herein as a load-balancer network server (LB-NS), can be designated to perform the edge network server assignments for a plurality of end devices, such as end devices 20-1 through 20-n. In one example, a service provider associated with the end devices may facilitate at least some provisioning of cNS 60. For example, configuration store 64 can include a list of serving edge network servers/gateways and indications of which applications require an edge network server allocation. In the illustrative scenario based on the example of FIGS. 1-2, configuration store 64 could include a list of gateways 30A-30C and edge network servers 40A-40C, along with an identifier of an application associated with application server 70A (and possibly other application identifiers of applications associated with other application servers). In at least one embodiment, the application identifiers in configuration store 64 may correspond to certain FPort information. In a LoRa™ architecture, an FPort field is an optional port field in a media access control (MAC) payload of a message from an end device. Certain values in the FPort field are application-specific and can serve as application identifiers.

In another example, cNS 60 can be provisioned with policies in policy store 66. The policies may be applied to potentially affect the selections of optimal gateways for one or more of the plurality of end devices. Additionally, in at least one embodiment, cNS 60 can also be provisioned with end device characteristics (e.g., static, mobile, etc.) and application characteristics (e.g., physical location, etc.).

The cNS can be provisioned with gateway (GW) selection logic 62 for selecting an appropriate gateway when an end device attempts to join the network. For example, a LoRa™ join request transmitted by an end device can be received by cNS 60 from each of the gateways that received the request from the end device. The cNS can determine which application and associated application server is to receive application data from the end device. In at least one embodiment, the application can be identified from an application identifier included in the join request (e.g., in FPort field). The application server that hosts the application can be identified based on a mapping between the application identifier and identifying information associated with the application server (e.g. IP address, port). In at least one embodiment, this mapping may be provided in configuration store 64.

Gateway selection logic 62 can differentiate between applications suitable for edge network server allocation and applications that are not suitable for edge network server allocation. In at least one embodiment, configuration store 64 contains information that indicates which applications require eNS allocation. This information can be compared to an application identifier included in a join request from an end device to determine whether to allocate an eNS to that end device. If an eNS is to be allocated, a gateway can be selected by the cNS based, at least in part, on a policy related to the gateway's proximity (and/or its associated eNS' proximity) to the application server identified for the end device.

In some implementations, additional or alternative considerations may be used to select a gateway with an associated eNS for an end device. For example, one or more other policies (e.g., policy store 66), an end device profile, latency, signals, or any other appropriate considerations may also or alternatively be used to select a gateway. Specific considerations can include, but are not necessarily limited to, characteristics of an end device (e.g., static vs. mobile, etc.), data transmission pattern from the end device, and/or the location of the end device.

Application servers, such as application servers 70 can be provisioned in cloud networks, such as cloud network 10B. An application server can include one or more applications configured to process data from certain end devices or certain types of end devices. For example, an electric meter in a house may send data related to electricity consumption to a service provider or entity that is supplying the electricity. Accordingly, an application server of the service provider or entity receives application data from the electric meter sensor, where the application data represents electricity consumption at the house. An application server that receives a certain type of application data is configured to appropriately process, log and respond (if needed) to the data it receives. In the electric meter example, the received data could be used for billing purposes, to identify abnormal consumption levels per house/street/neighborhood/city, or for any other desired purpose.

Some applications are configured to provide time-sensitive or critical information and/or responses based on application data received from an end device. The associated end devices may provide application data related to, for example, human safety, animal safety, environmental emergencies, and property risks. Low latency is desirable for such applications, which can be distinguished over other applications that may provide information and/or responses that are not time-sensitive or critical. In at least one embodiment, a cNS differentiates between applications related to time-sensitive or critical data and applications related to data that is not necessarily time-sensitive or critical. In at least some scenarios, a cNS may allocate an eNS for end devices that produce time-sensitive or critical data, but may not allocate an eNS for other end devices.

Figure 3:
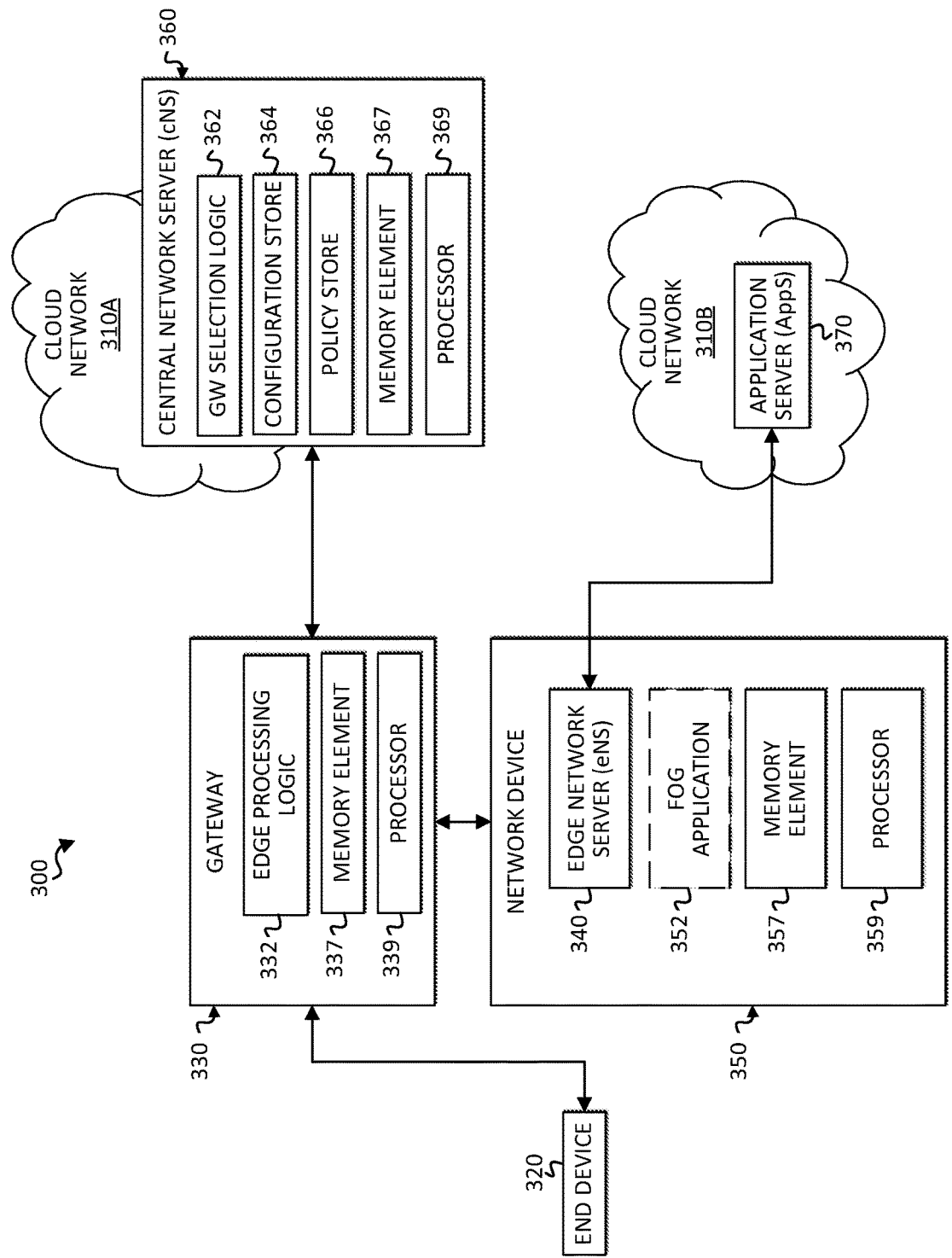
FIG. 3 is a simplified block diagram illustrating some possible details of another embodiment of a communication system according to the present disclosure.

FIG. 3 is a simplified block diagram illustrating one possible set of details associated with a communication system 300 for application based intelligent edge computing in accordance with another embodiment. For ease of illustration, a limited number of components are illustrated in FIG. 3. Communication system 300 includes an end device 320, which may be part of an end device network (not shown), a cloud network 310A including a central network server (cNS) 360, and a cloud network 310B including at least one application server (AppS) 370. The cNS 360 may be configured in a manner similar to cNS 60, including corresponding elements such as gateway (GW) selection logic 362, a configuration store 364, a policy store 366, a memory element 367, and a processor 369.

Communication system 300 also includes edge devices that facilitate communication between end device 320 (and other end devices in the end device network) and cloud networks 310A and 310B. In at least one embodiment, edge devices can include multiple pairs of gateways and edge network servers that are provisioned in separate network devices, such as gateway 330 and network device 350. Gateway 330 can include edge processing logic 332, a memory element 337, and a processor 339. Gateway 330 can be configured to operate in a manner similar to gateway 30A. Network device 350 can include an edge network server (eNS) 340, a memory element 357, and a processor 359. Edge network server 340 may be configured to operate in a manner similar to eNS 40A.

Optionally, network device 350 can also include a fog application 352, which may function in a manner similar to fog application 52. In at least one embodiment, eNS 340 and fog application 352 may be configured as separate virtual machines in network device 350. In other implementations, eNS 340 may not be configured virtually, and fog application may be provisioned in a separate network device from the eNS. It should be apparent that numerous pairs of gateways and network devices with an eNS (and possibly a fog application) may be implemented in communication system 300, but are omitted here for ease of illustration.

Figure 4:
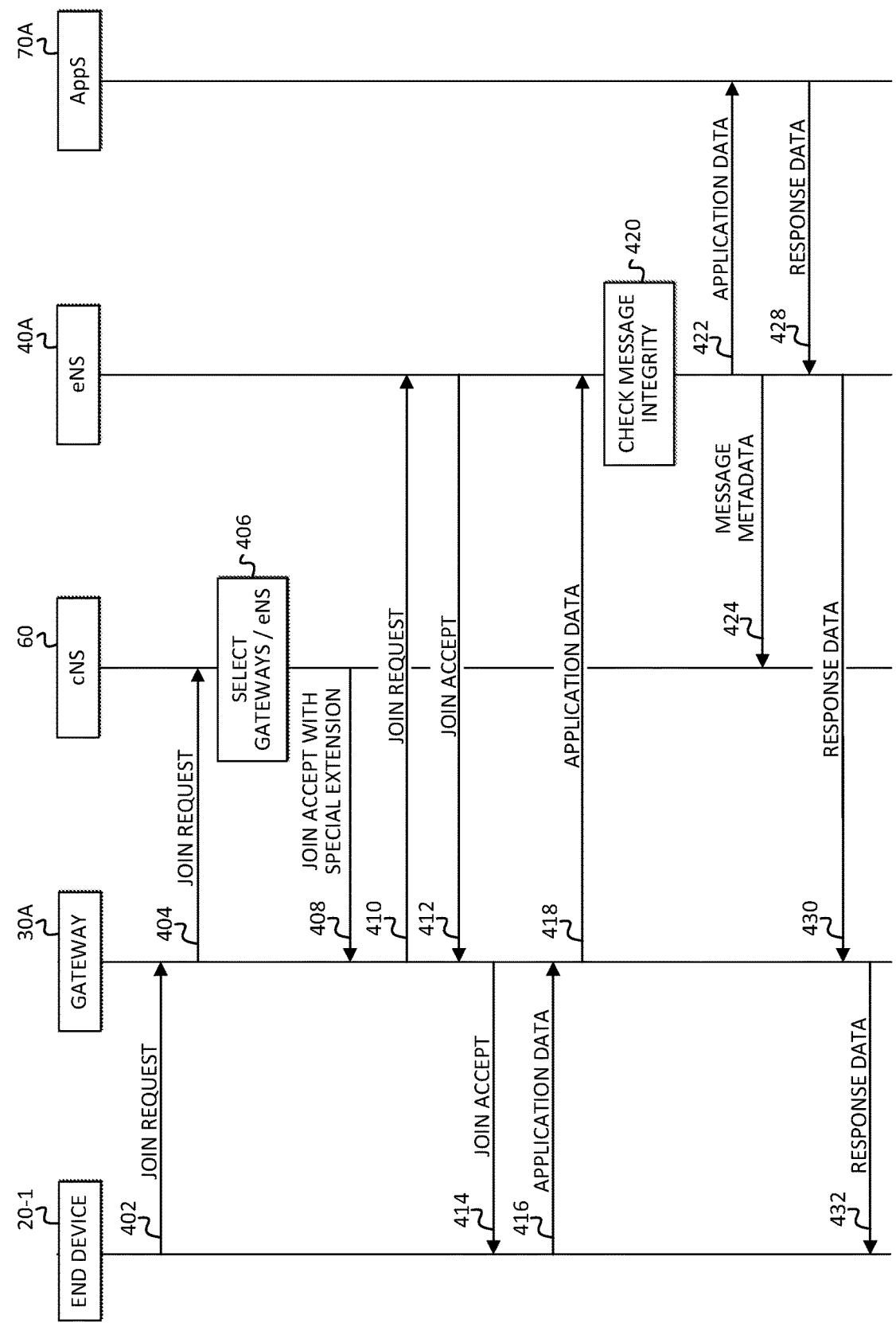
FIG. 4 is a simplified interaction diagram illustrating possible flows of the communication system according to any of the embodiments shown in FIGS. 1-3 of the present disclosure.
Figure 5:
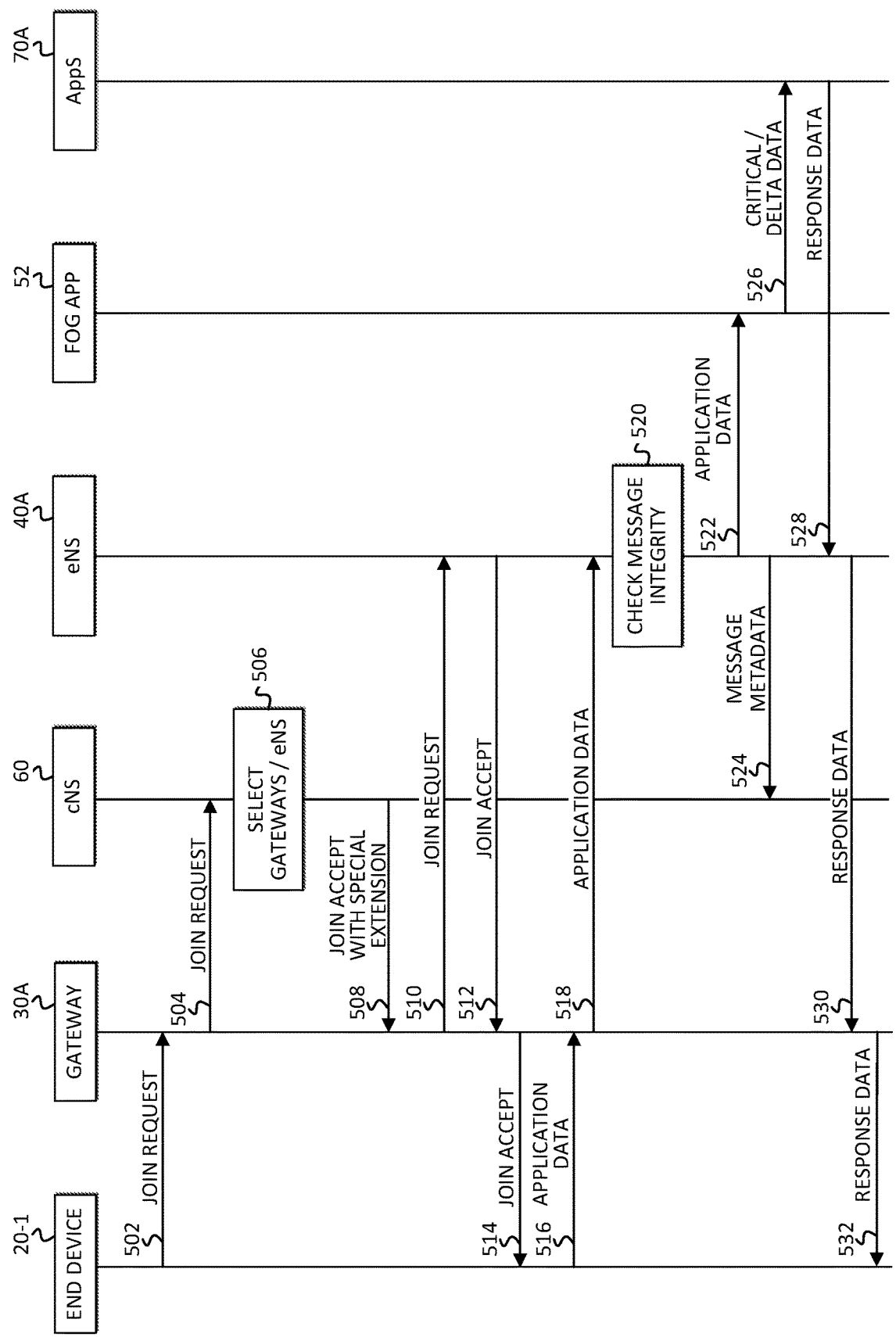
FIG. 5 is a simplified interaction diagram illustrating possible flows of the communication system according to any of the embodiments shown in FIGS. 1-3 of the present disclosure.

Turning to FIGS. 4 and 5, interaction diagrams illustrate possible interactions that may occur in a communication system for application based intelligent edge computing, such as communication systems 100 and 300. For ease of reference, FIGS. 4 and 5 will be described with reference to components of communication system 100. It is to be understood, however, that the interactions are also applicable to communication system 300. Furthermore, FIGS. 4 and 5 illustrate examples of potential interactions, and do not limit the scope of the claims. For instance, the number of modules may vary, the number of components may vary, the number of devices may vary, specific interactions may vary, the order of interactions may vary, etc.

FIG. 4 illustrates possible interactions that may occur in communication system 100 between end device 20-1, gateway 30A, cNS 60, eNS 40A and AppS 70A. At 402, end device 20-1 can send a request to join the network, such as a join request message in a LoRa™ network. The request to join the network can start a procedure to establish a network session. In a LoRa™ network, a join request is an uplink message that carries a physical (PHY) payload, which includes a media access control (MAC) payload and a message integrity code. The MAC payload includes an FPort field, which can contain FPort values that are application-specific and can serve as application identifiers. Thus, the FPort field can be used to identify an application that can process application data generated by the end device.

Gateway 30A can receive the request, along with other gateways (not shown), such as gateways 30B and 30C, that are within a transmission range of end device 20-1. Upon receiving a request to join the network, at 404, gateway 30A by default forwards the request to cNS 60. The gateway may also cache the request to join the network. Other gateways (not shown) may also forward join requests they received from end device 20-1 to cNS 60.

At 406, cNS 60 can select a primary gateway and possibly one or more secondary gateways. This selection may include identifying AppS 70A as the destination for application data generated by end device 20-1. For example, AppS 70A may be identified based on an application identifier determined from an FPort field in the join request message, which indicates an application associated with the end device. The cNS can determine which application server corresponds to the application based on a mapping between the application identifier and identifying information of an application server (e.g., IP address, port). The cNS can determine that an eNS is to be allocated to the end device based on the type of application (e.g., critical applications, sensitive applications). In at least one embodiment, a gateway is selected as the primary gateway based on policy, latency, and/or other considerations. For example, gateway 30A may be selected based on the proximity of its associated eNS 40A to AppS 70A. In this example, eNS 40A is collocated with gateway 30A. In other implementations, however, the eNS may not be collocated with its associated gateway (e.g., eNS 340 and gateway 330).

At 408, cNS 60 sends a reply message to the selected gateway (i.e., gateway 30A in this example) to accept the end device's request to join the network. In a LoRa™ network, the reply message can be configured as a join accept message. The join accept message can include a special extension that indicates to gateway 30A that it should forward the join request message to its associated eNS 40A. A special extension is a particular portion of the message used to convey additional information on the message or the way it should be processed. In at least one embodiment, the special extension can identify the eNS to which the join request message is to be forwarded. For example, if the eNS is not collocated with the gateway, then the special extension may include an identification of the eNS.

Upon receiving the join accept message with the special extension, gateway 30A can set an indicator that it is the designated primary gateway for end device 20-1. At 410, gateway 30A forwards the corresponding cached join request message to eNS 40A. The eNS can process the join request according to appropriate protocol and send a join accept reply message to end device 20-1 to accept the end device's request to join the network. Optionally, the join accept message received by gateway 30A from cNS 60 may also be forwarded to eNS 40A as a special extension to the cached join request message that is sent. This can increase efficiency of eNS 40A by eliminating the need for eNS 40A to generate a join accept message to be sent to end device 20-1. In at least one embodiment, the join accept message can be sent to gateway 30A at 412, and then forwarded by gateway 30A to end device 20-1 at 414. Accordingly, a session is established between end device 20-1 and eNS 40A.

Once the session is established between end device 20-1 and eNS 40A, end device 20-1 can begin sending application data to eNS 40A via gateway 30A, as shown at 416 and 418. At 420, after eNS 40A receives a message with application data, the integrity of the message carrying the application data can be validated by eNS 40A. At 422, eNS 40A can send the application data directly to AppS 70A. The application data may be contained in the FRM_PAYLOAD of a message originated by the end device in a LoRa™ network. The application data sent to AppS 70A may include a timestamp in some embodiments (e.g., for applications based on FPort). Optionally, at 424, eNS 40A sends message metadata to cNS 60 to help cNS 60 make mobility, RRM and location tracking decisions. Optionally, in LoRa™ networks, a MAC command can be sent by eNS 40A to cNS 60 for centralized processing of control and management capabilities. It should be noted that messages sent by eNS 40A might first be sent to gateway 30A, which can then forward or otherwise route the messages to the appropriate receiving entities (e.g., AppS 70A, cNS 60, end device 20-1).

At 428, any downlink transmission from AppS 70A, such as response data, can bypass cNS 60 and be sent directly to eNS 40A. The downlink transmission may be received by gateway 30A and routed to eNS 40a. The eNS 40A can then schedule a downlink transmission to end device 20-1 based on the transmission (Rx) window of the end device through primary gateway 30A, as shown at 430 and 432. It should be apparent that operations shown and described with reference to 416-432 may be applicable to any uplink transmissions from end device 20-1 while the network session is established.

Although not shown in FIG. 4, cNS 60 may also select one or more overlapping gateways (i.e., other gateways that receive the join request message from end device 20-1) to be designated secondary gateways. The cNS can send a message to the selected one or more gateways to notify them of their designation. This can be done to enable mobility and location tracking for mobile end devices so that each time one of the secondary gateways receives application data (or another packet) from end device 20-1, metadata from the received message can be forwarded to cNS 60.

FIG. 5 illustrates possible interactions that may occur in an embodiment of communication system 100 that includes fog application 52. Accordingly, FIG. 5 illustrates possible interactions between end device 20-1, gateway 30A, cNS 60, eNS 40A, fog application 52, and AppS 70A. Interactions and operations indicated at 502-520 in FIG. 5 correspond to interactions and operations indicated at 402-420, respectively, in FIG. 4. For simplicity, a description of these interactions and operations will not be repeated herein.

After eNS 40A validates the integrity of the received message with application data at 520, then at 522, eNS 40A can forward the application data to fog application 52. In one implementation, fog application 52 could be running on network device 50 (e.g., as a virtual machine) with gateway 30A and eNS 40A. In another implementation, fog application 52 could be running on a network device (e.g., as a virtual machine) with eNS 40A, which is separate from gateway 30A as in FIG. 3.

Fog application 52 can differentiate, based on policy, between certain relevant data (e.g., critical data) or delta data that needs to be processed by AppS 70 and other data that fog application 52 can suitably process. In one example, if the received application data includes data that is determined to be relevant (e.g., critical data) or changed according to a threshold amount (e.g., delta data), then the application data may be forwarded to AppS 70 and processed there. Otherwise, fog application 52 may process the application data.

Interactions and operations indicated at 528-532 of FIG. 5 correspond to interactions and operations indicated at 428-432, respectively, of FIG. 4. In another scenario, however, if the fog application processes the end device data, then fog application 52 may send response data to end device 20-1 via gateway 30A and possibly via eNS 40A.

Figure 6:
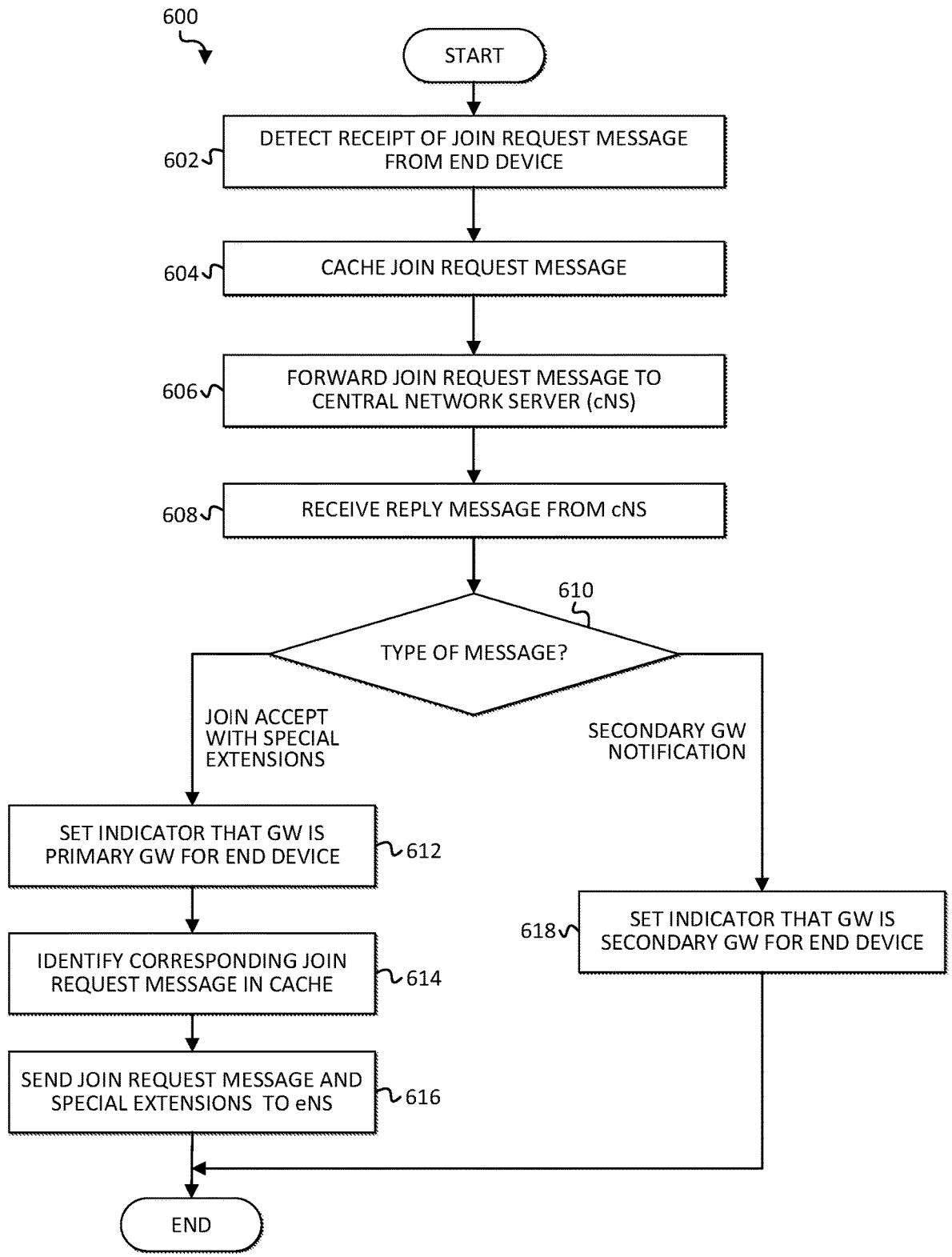
FIG. 6 is a simplified flowchart of potential operations associated with a communication system according an embodiment of the present disclosure.

Turning to FIGS. 6-12, various flowcharts illustrate possible operations associated with one or more embodiments of a communication system for application based intelligent edge computing disclosed herein. In FIG. 6, a flow 600 may be associated with one or more sets of operations. A gateway (e.g., 30A, 30B, 30C, 330) or network device on which a gateway is provisioned (e.g., 50) may comprise means such as one or more processors (e.g., 59, 339), for performing the operations. In one example, at least some operations shown in flow 600 may be performed by edge processing logic (e.g., 32A, 332).

At 602, the gateway can detect receipt of a join request message from an end device (e.g., end device 20-1). At 604, the gateway can cache the join request message. At 606, the join request message can be forwarded to a central network server (e.g., cNS 60). At 608, the gateway can receive a reply message from the cNS.

At 610, a determination can be made as to what type of message the gateway has received. If a determination is made that the gateway has received a join accept message with a special extension, then at 612, an indicator can be set to indicate that the gateway is designated by the cNS as the primary gateway for the end device. At 614, the join request message corresponding to the received join accept message can be identified in the cache of the gateway. At 616, the gateway can send the join request message to its associated eNS (e.g., 40A, 340) associated with the gateway. Optionally, the join request message sent to the eNS may include a special extension containing the join accept message so that it does not have to be generated by the eNS. With reference again to 610, if a determination is made that the gateway has received a message including a notification that the gateway has been designated as a secondary gateway, then at 618, an indicator can be set to indicate the gateway is designated by the cNS as a secondary gateway for the end device.

In another embodiment, a join accept message received by the gateway may not include a special extension. In this embodiment, an eNS is not allocated to the end device. Application data can be forwarded by the gateway to the cNS, which can then forward the data to the appropriate application server.

Figure 7:
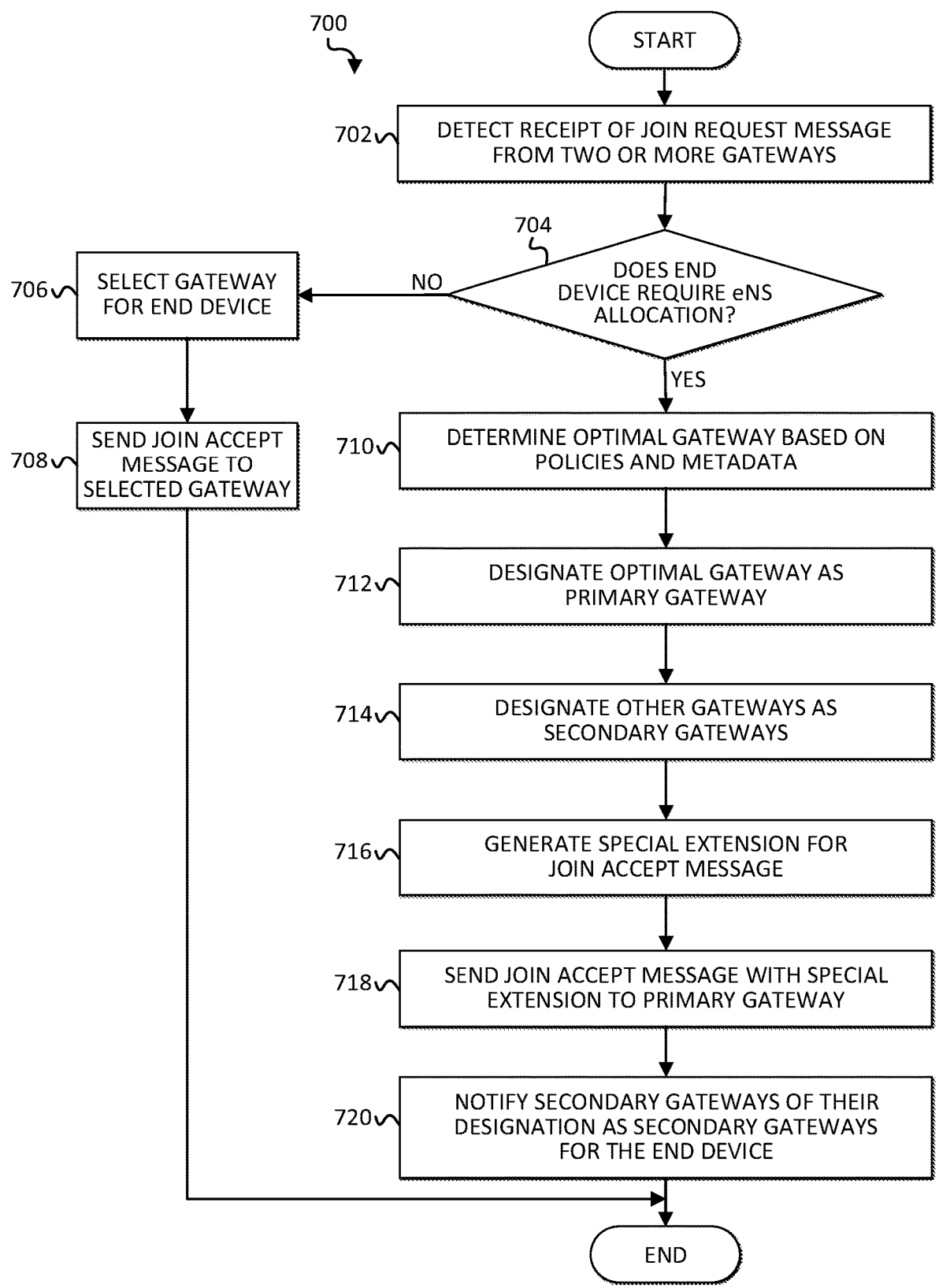
FIG. 7 is a simplified flowchart of potential operations associated with a communication system according to an embodiment of the present disclosure.

In FIG. 7, a flow 700 may be associated with one or more sets of operations. A central network server (e.g., 60, 360) may comprise means such as one or more processors (e.g., 69, 369), for performing the operations. In one example, at least some operations shown in flow 700 may be performed by gateway selection logic (e.g., 62, 362). In addition, policies (e.g., policy stores 66 and 366) and lists (e.g., configuration stores 64 and 364) may provide information used by the gateway selection logic.

At 702, the cNS can detect receipt of a join request message from two or more gateways, where the join request message was generated by an end device (e.g., end device 20-1). At 704, the cNS can determine whether the end device requires eNS allocation. An application server associated with the end device can be identified based, at least in part, on the join request message. For example, an FPort field in the message may contain information identifying an application (e.g., application identifier) associated with the end device. Based on the application identifier, the cNS can then identify an application server that is associated with the application and that can process data generated by the end device.

A configuration store may indicate which FPort values require eNS allocation for the end device. In at least one embodiment, based on the FPort information and other information contained in the configuration store, the cNS can determine whether an eNS is to be allocated for the end device. In at least one implementation, the other information may indicate an eNS is to be allocated for every end device. In another implementation, the other information may indicate an eNS is to be allocated for end devices associated with a particular type of application such as critical or sensitive applications. It will be apparent that many other configurations are possible based on particular needs and implementations.

If a determination is made that an eNS is not to be allocated for the end device, then at 706, a gateway can be selected for the end device according to existing protocols. At 708, a join accept message without a special extension can be sent to the selected gateway.

If a determination is made that an eNS is to be allocated for the end device, then at 710, an optimal gateway for the end device can be determined based on policies and possibly relevant metadata. For example, the policies may indicate that the gateway with an associated eNS that is closest to the identified application server is to be selected. In addition, policies associated with one or more other considerations such as end device characteristics, end device data transmission patterns, end device location, latency and end device profile, for example, may also be evaluated when selecting an optimal gateway. At 712, the selected gateway may be designated as a primary gateway for the end device. At 714, one or more other overlapping gateways (if any) may be designated as secondary gateways. Overlapping gateways can include any or all other gateways from which the cNS received the same join request from the end device. Designating gateways as primary and secondary can include storing an indication of the designations in the cNS.

At 716, the cNS can generate a special extension for a join accept message to be sent in response to the join request message. In at least one embodiment, a special extension can include information indicating that the join request message is to be sent to the eNS associated with the primary gateway. Special extensions also serve to notify the receiving gateway that it is designated as a primary gateway for the end device. At 718, the join accept message with the special extension can be sent to the primary gateway. At 720, the cNS can notify the other overlapping gateways (if any) of their designation as secondary gateways for the end device.

Figure 8:
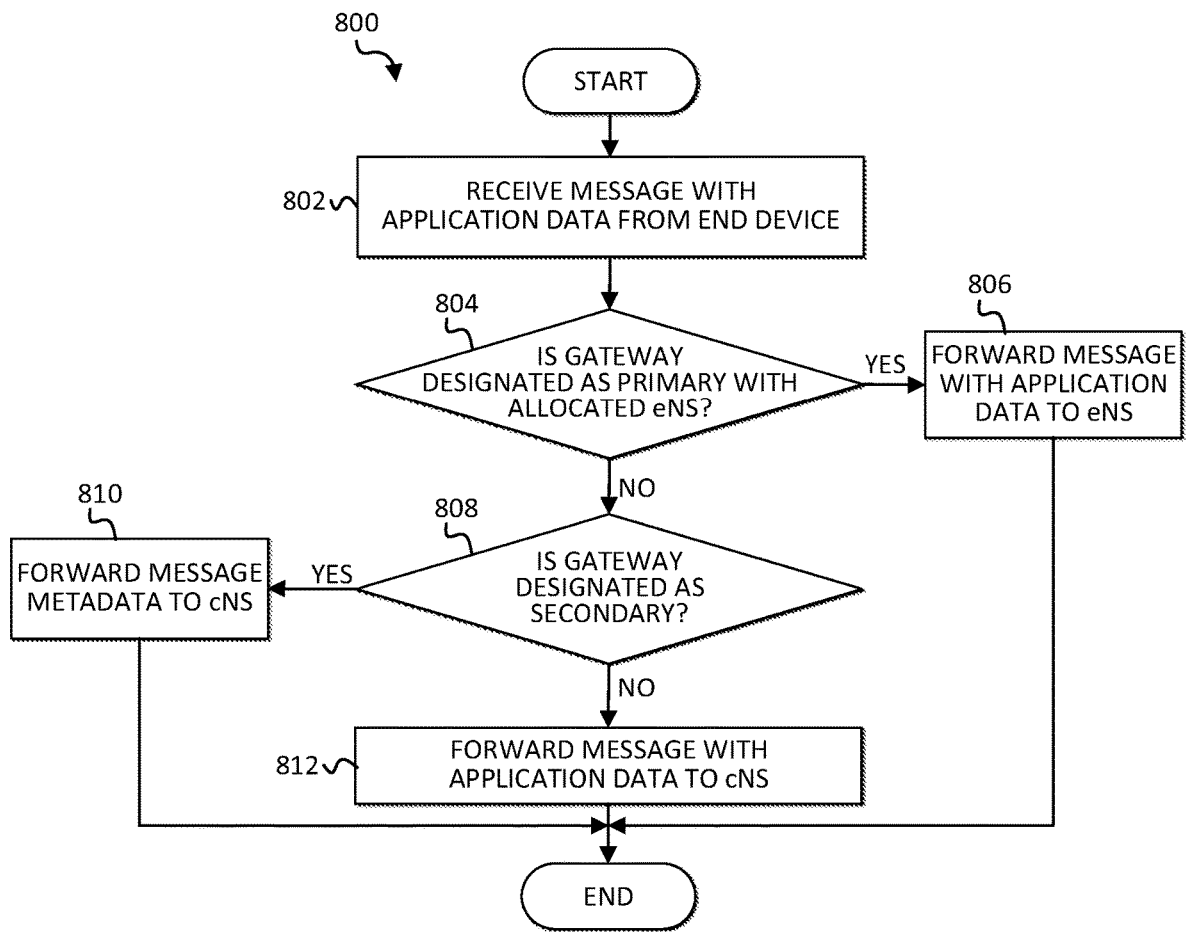
FIG. 8 is a simplified flowchart of potential operations associated with a communication system according to an embodiment of the present disclosure.

In FIG. 8, a flow 800 may be associated with one or more sets of operations. A gateway (e.g., 30A, 30B, 30C, 330) or edge network device on which a gateway is provisioned (e.g., 50) may comprise means such as one or more processors (e.g., 59, 339), for performing the operations. In one example, at least some operations shown in flow 800 may be performed by edge processing logic (e.g., 32A, 332). Flow 800 can be performed after a session is established via an end device (e.g., 20-1, 320) and an eNS (e.g., 40A-40C, 340) associated with the gateway (e.g., 30A-30C, 330).

At 802, the gateway can receive a message with application data from the end device. At 804, the gateway can determine whether it is designated as a primary gateway with an allocated eNS for the end device. In at least one embodiment, this can be determined based on an indicator set by the gateway based on receiving a join accept message with a special extension from a cNS (e.g., 60, 360). If the gateway determines it is designated as a primary gateway with an allocated eNS for the end device, then at 806, the gateway can forward the message with the application data to the eNS.

If the gateway determines, at 804, that it is not designated as a primary gateway, then at 808, the gateway can determine whether it is designated as a secondary gateway. If it is determined that the gateway is designated as a secondary gateway, then the message is not forwarded, but at 810, message metadata can be forwarded to the cNS. This message metadata can include, but is not necessarily limited to, a timestamp, received signal strength indicator (RSSI), signal to noise ratio (SNR), frame count (FCnt), and/or device address (DevAddr). If it is determined, at 808, that the gateway is not designated as a secondary gateway, then an eNS is not allocated for the end device and the message with application data can be forwarded to the cNS and processed according to existing protocol.

Figure 9:
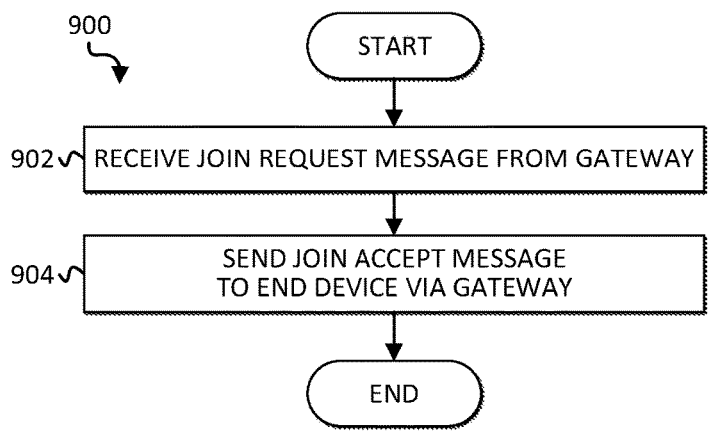
FIG. 9 is a simplified flowchart of potential operations associated with a communication system according to an embodiment of the present disclosure.
Figure 10:
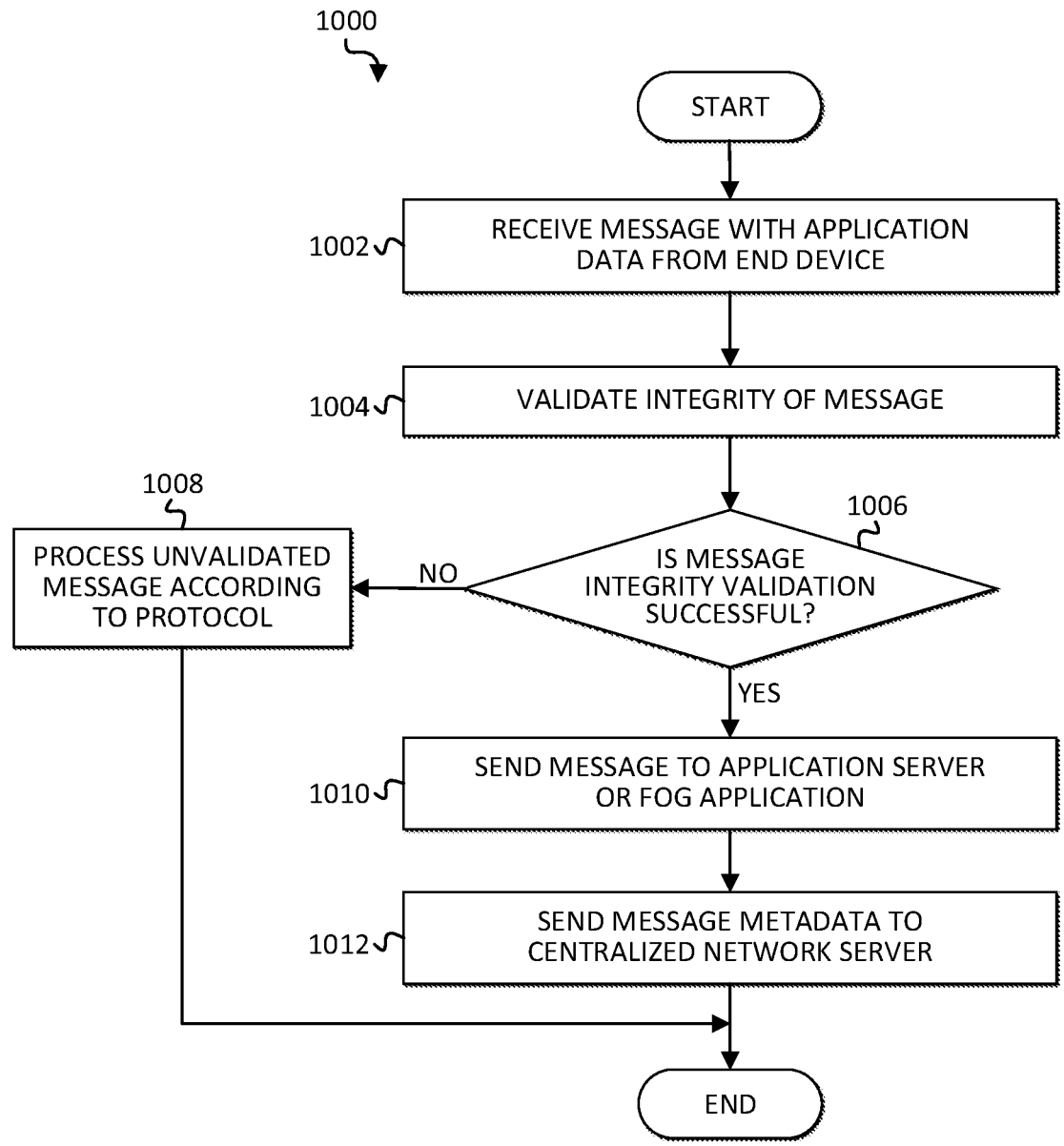
FIG. 10 is a simplified flowchart of potential operations associated with a communication system according to an embodiment of the present disclosure.

In FIGS. 9 and 10, respective flows 900 and 1000 may be associated with one or more sets of operations. An edge network server (e.g., 40A-40C, 340) or a network device on which edge network server is provisioned (e.g., 50, 350) may comprise means such as one or more processors (e.g., 59, 359), for performing the operations. In one example, at least some operations shown in flows 900 and 1000 may be performed by logic stored in the eNS.

In at least one embodiment, flow 900 can be performed by an eNS after its associated gateway receives a join accept message from a cNS (e.g., 60, 360) indicating that it is designated as a primary gateway and that its associated eNS is to be allocated for end device. At 902, the eNS receives the join request message from the gateway. The join request message was previously sent by the end device to the gateway, cached by the gateway, and then forwarded to the cNS. If the eNS decides to accept the request, at 904, the eNS can send a join accept message to the end device via the gateway. Thus, a session can be established between the end device and the eNS. In some embodiments, the eNS generates the join accept message to be sent to the end device. In other embodiment, the eNS may receive the join accept message from the gateway in a special extension of the join request message. In this implementation, the eNS may extract the join accept message from the special extension and send it to the end device.

In at least one embodiment, flow 1000 can be performed by an eNS after a session has been established between the eNS and an end device. Furthermore, flow 1000 may be repeated for each message received by the eNS from the end device during the session. At 1002, a message with application data from the end device is received by the eNS via its associated gateway. At 1004, the eNS can attempt to validate the integrity of the message. At 1006, if it is determined that validation was not successful, then at 1008 the unvalidated message may be processed according to appropriate protocol (e.g., message dropped, error message returned to end device, etc.).

If it is determined that the validation of the message integrity was successful at 1006, then at 1010, the eNS can send the message to the appropriate application server or fog application, depending on the implementation. The application server may be identified based, at least in part, on an application identifier contained in the join request message. If a fog application (e.g., 52, 352) is provisioned in the communication system, then the fog application can process any uplink application data from the end device. At 1012, the eNS can optionally send message metadata to the cNS. Such metadata can include, but is not limited to, a timestamp associated with the receipt of the message, RSSI, SNR, FCnt, and/or device address (DevAddr).

Figure 11:
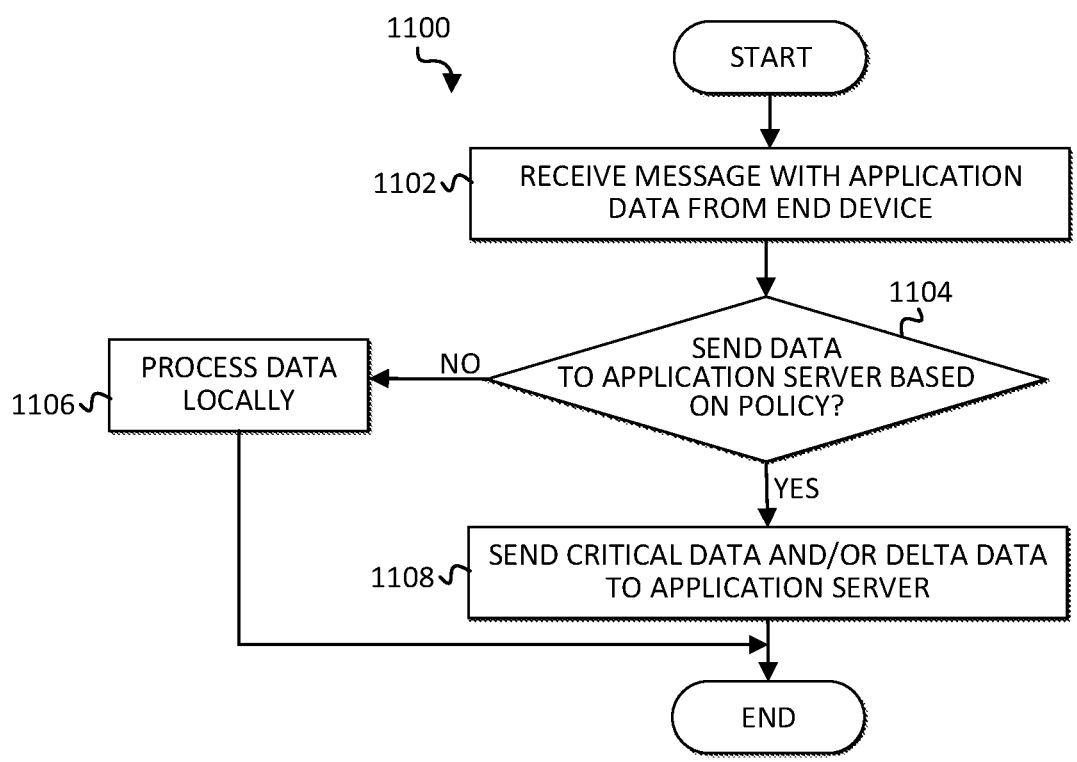
FIG. 11 is a simplified flowchart of potential operations associated with a communication system according to an embodiment of the present disclosure.

In FIG. 11, a flow 1100 may be associated with one or more sets of operations. A fog application (e.g., 52, 352) or a network device on which a fog application is provisioned (e.g., 50, 350) may comprise means such as one or more processors (e.g., 59, 339), for performing the operations. In one example, at least some operations shown in flow 1100 may be performed by the fog application. Flow 1100 may be performed after a session is established between an eNS and an end device, as previously described herein, and a message with application data from the end device is received by the eNS.

At 1102, the fog application receives a message with application data from the end device. The message may be received from a collocated eNS that has been allocated to the end device by a cNS. The application data can be evaluated at 1104, based on one or more policies, to determine whether it is to be processed locally by the fog application or forwarded to the appropriate application server. In one example, if application data is critical data (e.g., related to the safety and/or protection of humans, animals, property and/or the environment), then the data may be sent directly to the application server at 1108. Similarly, if the application data has changed relative to previously received application data or baseline application data, then the application data may be evaluated based on a threshold to determine whether to send the delta data to the application server at 1108. Otherwise, at 1104, if a determination is made to not send the application data to the application server, then at 1106, the application data can be processed locally by the fog application. In at least some embodiments, the fog application can perform analytics and any other suitable computations on the application data.

In another embodiment, the determination as to whether the application data can be processed by the fog application or sent directly to the application server can be made by the eNS. Once the determination is made, the eNS can forward the application data to the appropriate entity.

Figure 12:
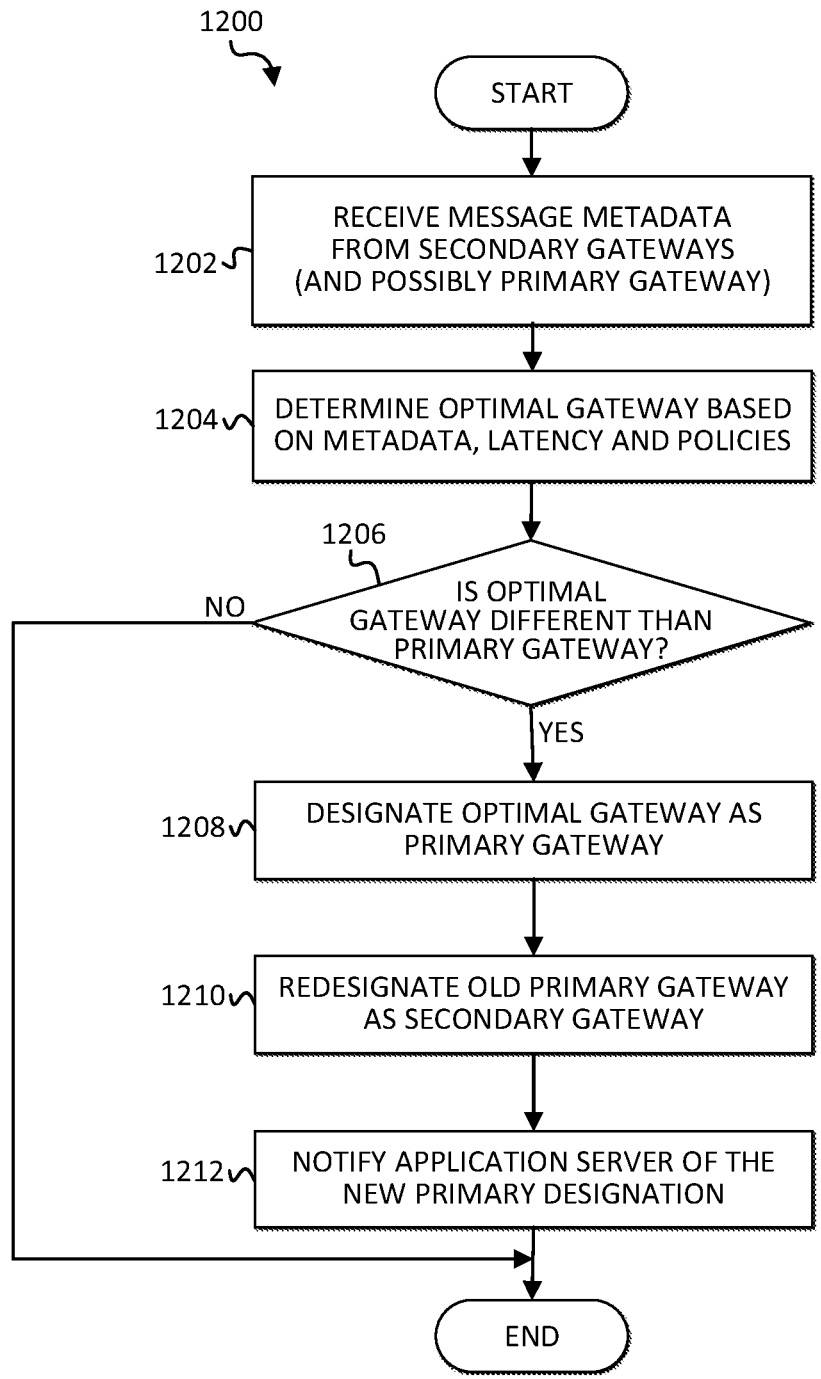
FIG. 12 is a simplified flowchart of potential operations associated with a communication system according to an embodiment of the present disclosure.

In FIG. 12, a flow 1200 may be associated with one or more sets of operations. A central network server (e.g., 60, 360) may comprise means such as one or more processors (e.g., 69, 369), for performing the operations. In one example, at least some operations shown in flow 1200 may be performed by gateway selection logic (e.g., 62, 362). In addition, policies (e.g., policy stores 66 and 366) and lists (e.g., configuration stores 64 and 364) may provide information used by the gateway selection logic. In at least one embodiment, flow 1200 can be performed after the cNS designates a primary gateway and one or more secondary gateways (e.g., 30A-30C, 330) for an end device (e.g., 20-1 through 20-n, 320), and a network session has been established between the end device and an eNS (e.g., 40A-40C, 340) associated with the primary gateway.

At 1202, the cNS receives message metadata from one or more secondary gateways. Each secondary gateway may send message metadata to the cNS subsequent to receiving a message from the end device. The same message may be received at each of the secondary gateways, but the metadata may vary. Such metadata can include, but is not necessarily limited to, a timestamp, RSSI and SNR. Additionally, in some implementations, message metadata may also be received from the primary gateway subsequent to the primary gateway receiving the message from the end device.

At 1204, the cNS can determine an optimal gateway for the end device based on the metadata, latency, and/or policies. Policies can relate to one or more considerations including, but are not necessarily limited to, the proximity of the available gateways and each associated eNS to the application server, location of the end device (e.g., relative to the available gateways), end device profile, end device characteristics, end device data transmission patterns, and signals (e.g., RSSI, SNR, etc.). Determining an optimal gateway based on these considerations can allow for mobility of the end device. At 1206, a determination is made as to whether the determined optimal gateway is different from the currently designated primary gateway. If they are the same, then the flow can end. If they are different, however, then operations may be performed to switch the primary gateway designation from the currently designated primary gateway to the newly determined optimal gateway.

At 1208, the newly determined optimal gateway can be designated as the primary gateway by creating context in the primary gateway and the cNS (e.g., causing an indicator to be set in the primary gateway and the cNS to indicate the primary designation). At 1210, the old primary gateway may be redesignated as a secondary gateway if it can still adequately support a session with the end device. These designations can be performed by simple message exchanges between the gateways and the cNS. At 1212, the cNS notifies the application server of the new primary designation if the new gateway includes an associated eNS (e.g., collocated or separate).

Figure 13:
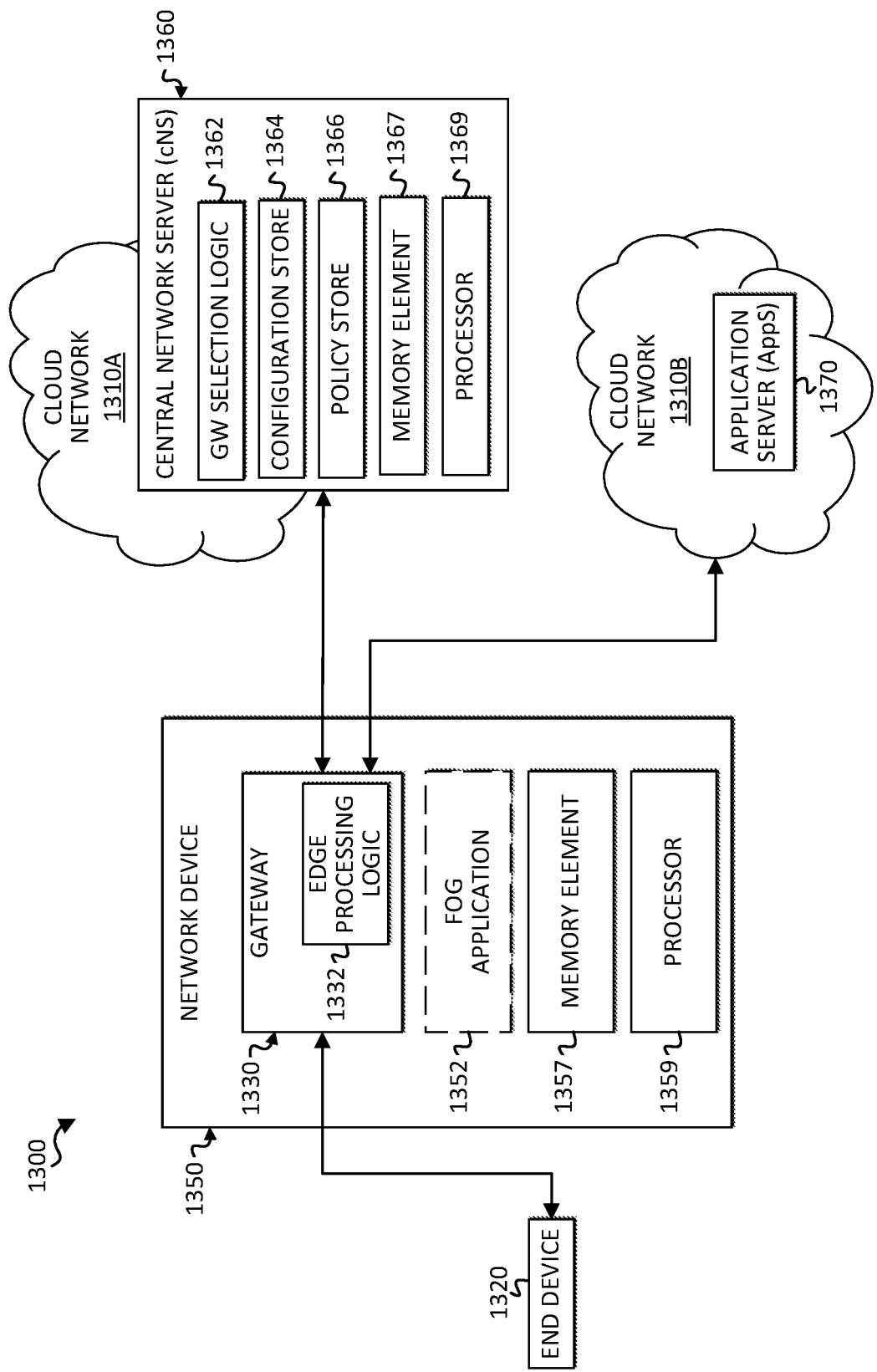
FIG. 13 is a simplified block diagram illustrating some possible details of yet another embodiment of a communication system according to the present disclosure.

FIG. 13 is a simplified block diagram illustrating one possible set of details associated with a communication system 1300 for application based intelligent edge computing in accordance with another embodiment. For ease of illustration, a limited number of components are illustrated in FIG. 13. Communication system 1300 includes an end device 1320, which may be part of an end device network (not shown), a cloud network 1310A including a central network server (cNS) 1360, and a cloud network 1310B including at least one application server (AppS) 1370. The cNS 1360 may be configured in a manner similar to cNS 60, including corresponding elements such as gateway selection logic 1362, a configuration store 1364, a policy store 1366, a memory element 1367, and a processor 1369.

Communication system 1300 also includes edge devices that facilitate communication between end device 1320 (and other end devices in the end device network) and cloud networks 1310A and 1310B. In at least one embodiment, edge devices can include multiple gateways that are provisioned in separate network devices. An example is illustrated as gateway 1330 provisioned in network device 1350. Gateway 1330 can include edge processing logic 1332. Network device 1350 can also include a memory element 1357 and a processor 1359. Gateway 1330 can be configured to operate in a manner similar to gateway 30A, but without an associated edge network server.

Optionally, network device 1350 can also include a fog application 1352, which may function in a manner similar to fog application 52. In at least one embodiment gateway 1330 and fog application 1352 may be configured as separate virtual machines in network device 1350. In other implementations, gateway 1330 may not be configured virtually, and fog application may be provisioned in a separate network device from the gateway. It should be apparent that numerous gateways may be implemented in communication system 1300, but are omitted here for ease of illustration.

Figure 14:
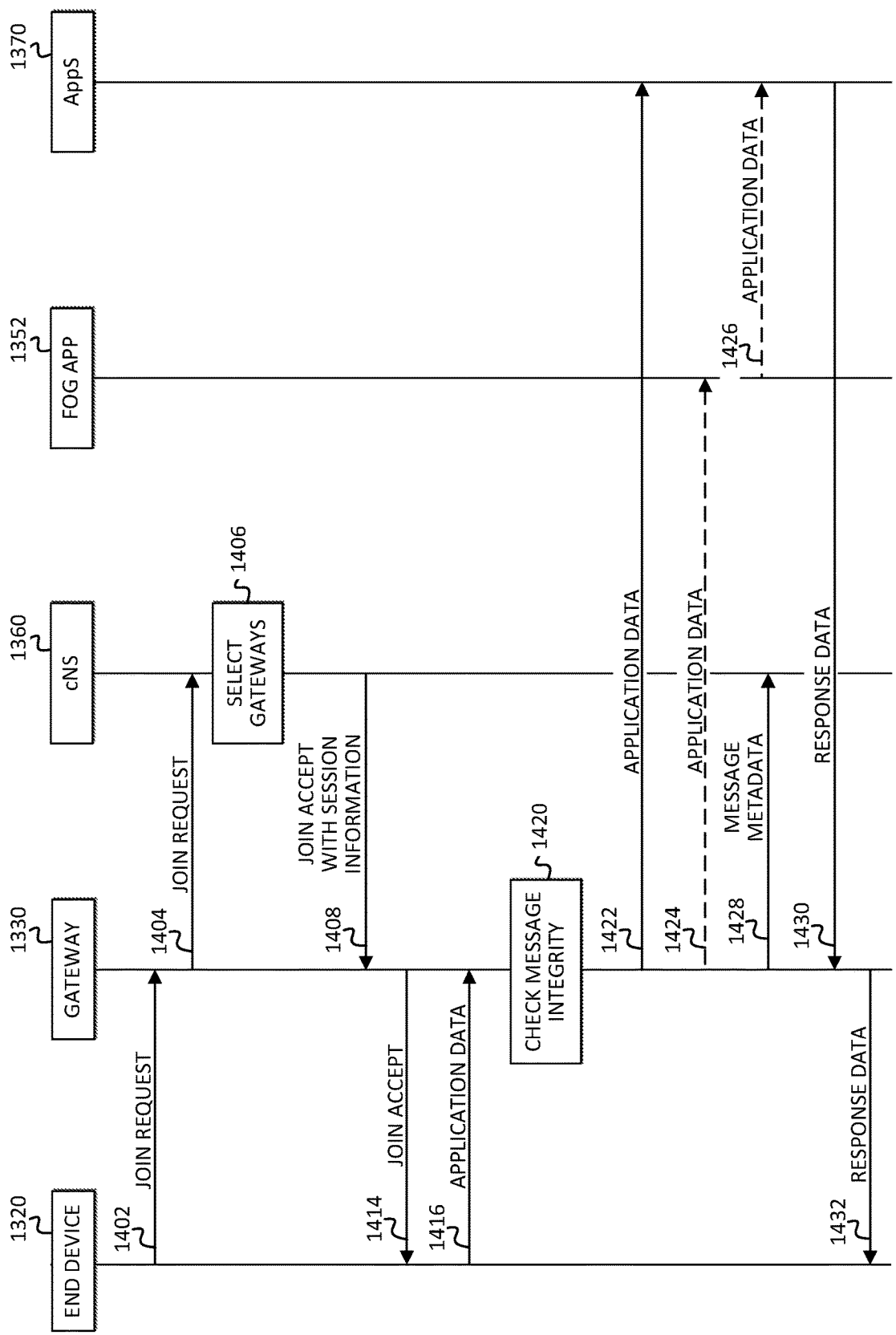
FIG. 14 is a simplified interaction diagram illustrating possible flows of the communication system of FIG. 13 according to the present disclosure.

FIG. 14 illustrates possible interactions that may occur in communication system 1300. Accordingly, FIG. 14 illustrates possible interactions between end device 1320, gateway 1330, cNS 1360, fog application 1352, and AppS 1370. FIG. 14 illustrates examples of potential interactions, and does not limit the scope of the claims. For instance, the number of modules may vary, the number of components may vary, specific interactions may vary, the order of interactions may vary, etc.

At 1402, end device 1420 can send a request to join the network, such as a join request message in a LoRa™ network, as previously described herein at least with respect to FIGS. 4 and 5. Gateway 1330 can receive the request, along with other gateways (not shown) that are within a transmission range of end device 1320. Upon receiving a request to join the network, at 1404, gateway 1330 by default forwards the request to cNS 1360. Other gateways (not shown) may also forward join requests they received from end device 1320 to cNS 1360.

At 1406, cNS 1360 can select a primary gateway and possibly one or more secondary gateways. This selection may include identifying AppS 1370 as the destination for application data generated by end device 1320. For example, AppS 1370 may be identified based on an application identifier determined from an Fport field in the join request message, which indicates an application associated with the end device. The cNS can determine which application server (e.g., AppS 1370) corresponds to the application based on a mapping between the application identifier and identifying information of an application server (e.g., IP address, port). In at least one embodiment, gateway 1330 may be selected as the primary gateway based on policy, latency, and/or other considerations. For example, gateway 1330 may be selected based on its proximity to AppS 1370.

At 1408, cNS 1360 sends a reply message to the selected gateway (i.e., gateway 1330 in this example) to accept the end device's request to join the network. In a LoRa™ network implementation, the reply message can be configured as a join accept message. The join accept message can include a special extension that contains session information to indicate that gateway 1330 is designated as the primary gateway for end device 1320, and to provide session information to enable communication between end device 1320 and the selected application server, AppS 1370. In at least one embodiment, the session information includes a network session key (NwkSKey) that is used for interaction between a node (e.g., end device 1320) and the network (e.g., via gateway 1330). The session information can also include a device address (DevAddr) that identifies the end device within the current network. Fport information and details related to AppS 1370 may be provisioned at gateway 1330 for some or all applications.

Upon receiving the join accept message with the session information, gateway 1330 can set an indicator that it is the designated primary gateway for end device 1320. At 1414, gateway 1330 can forward the join accept message to end device 1320. End device 1320 can process the join accept message, and the network session can be established between end device 1320 and gateway 1330 based, at least in part, on the session information received by gateway 1330.

Once the session is established, end device 1320 can begin sending application data to gateway 1330, as shown at 1416. At 420, after gateway 1330 receives the application data, the integrity of the message carrying the application data can be validated by gateway 1330. At 1422, gateway 1330 can send the application data directly to AppS 1370. The application data may be contained in the FRM_PAYLOAD of a message originated by the end device in a LoRa network. The message sent to AppS 1370 may include a timestamp in some embodiments (e.g., for applications based on Fport).

In another embodiment, fog application 1352 could be collocated with gateway 1330, for example, in network device 1350, or potentially in a network device separate from gateway 1330. In this embodiment that includes fog application 1352, uplink application data could be forwarded, at 1424, to fog application 1352 from gateway 1330, rather than directly to AppS 1370. The processing of fog application 1352 could be performed in a manner similar to fog application 52, as previously described herein. At 1426, certain data may be sent to AppS 1370, depending on the evaluation of the application data by fog application 1352.

Optionally, at 1428, gateway 1330 sends message metadata to cNS 1360 to help make mobility, RRM and location tracking decisions. Message metadata may include, for example, a timestamp associated with the message, RSSI, SNR, FCnt, DevAddr, along with a MAC command (if any) received from the end device. The MAC command can be sent to cNS 1360 for centralized processing of control and management capabilities.

At 1430, any downlink transmission from AppS 1370, such as response data, can be sent directly to primary gateway 1330, which can then direct the downlink transmission to end device 1320. In another scenario, however, if the fog application processes the end device data, then fog application 1352 may receive the response data from AppS 1370 and may send the response data to end device 1320 via gateway 1330.

The cNS can schedule any downlink MAC command based on the transmission (Rx) window of the end device, based on the metadata received from primary gateway 1330. Primary gateway 1330 can either collate the downlink MAC command with the downlink response data and send it as a single message to end device 1320 in the downlink direction, or send the downlink LoRaMAC command in the next Rx time slot giving preference to downlink response data or vice versa.

Although not shown in FIG. 14, cNS 1360 may also select one or more overlapping gateways (i.e., other gateways that receive the join request message from the end device) to be designated secondary gateways. The cNS can send a message to the selected one or more gateways to notify them of this designation. This can be done to enable mobility and location tracking for mobile end devices so that each time one of the secondary gateways receives end device data (or other packet) from end device 1320, as indicated at 1416, metadata from the received message can be forwarded to cNS 1360.

Figure 15:
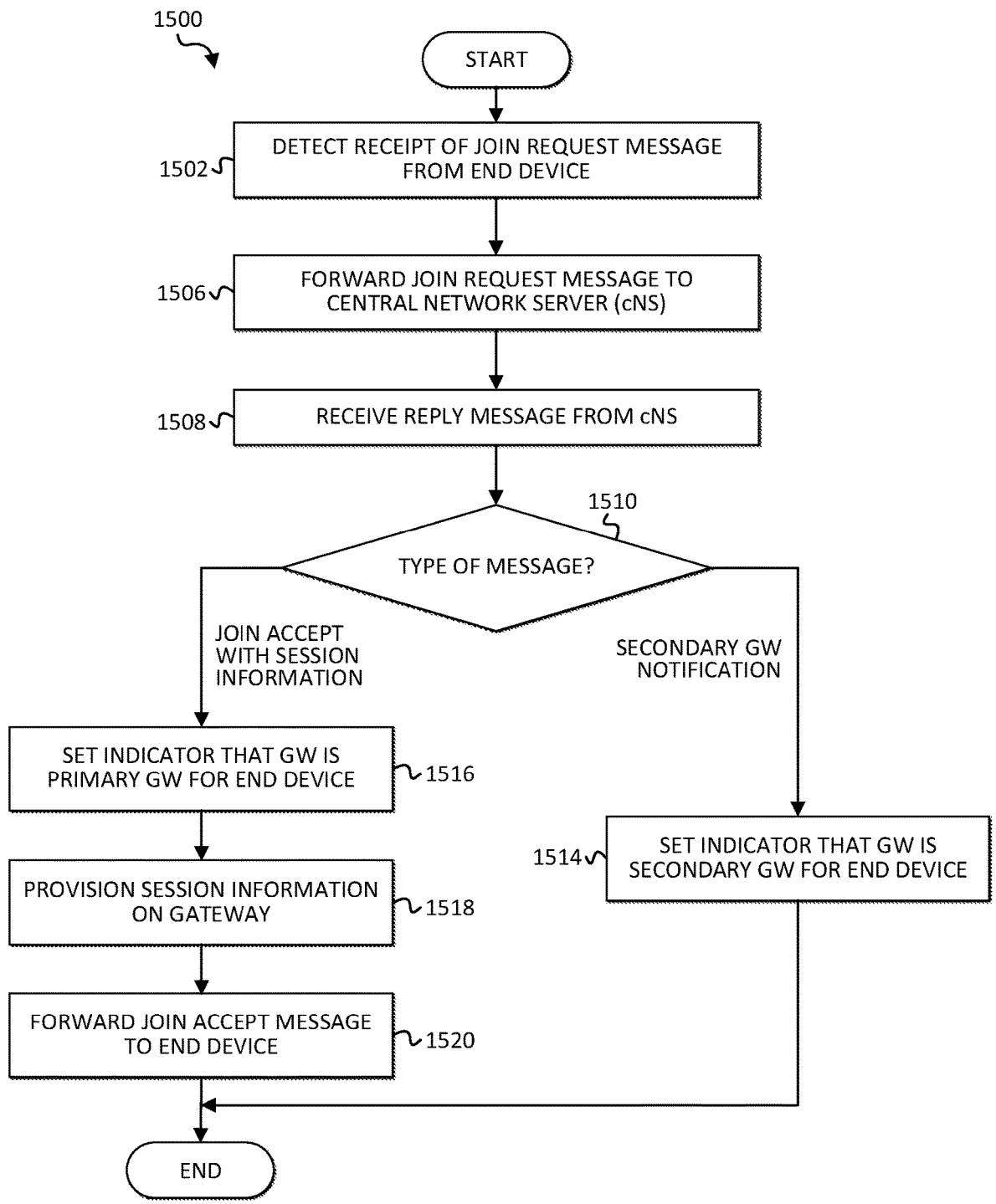
FIG. 15 is a simplified flowchart of potential operations associated with a communication system according to an embodiment of the present disclosure.
Figure 16:
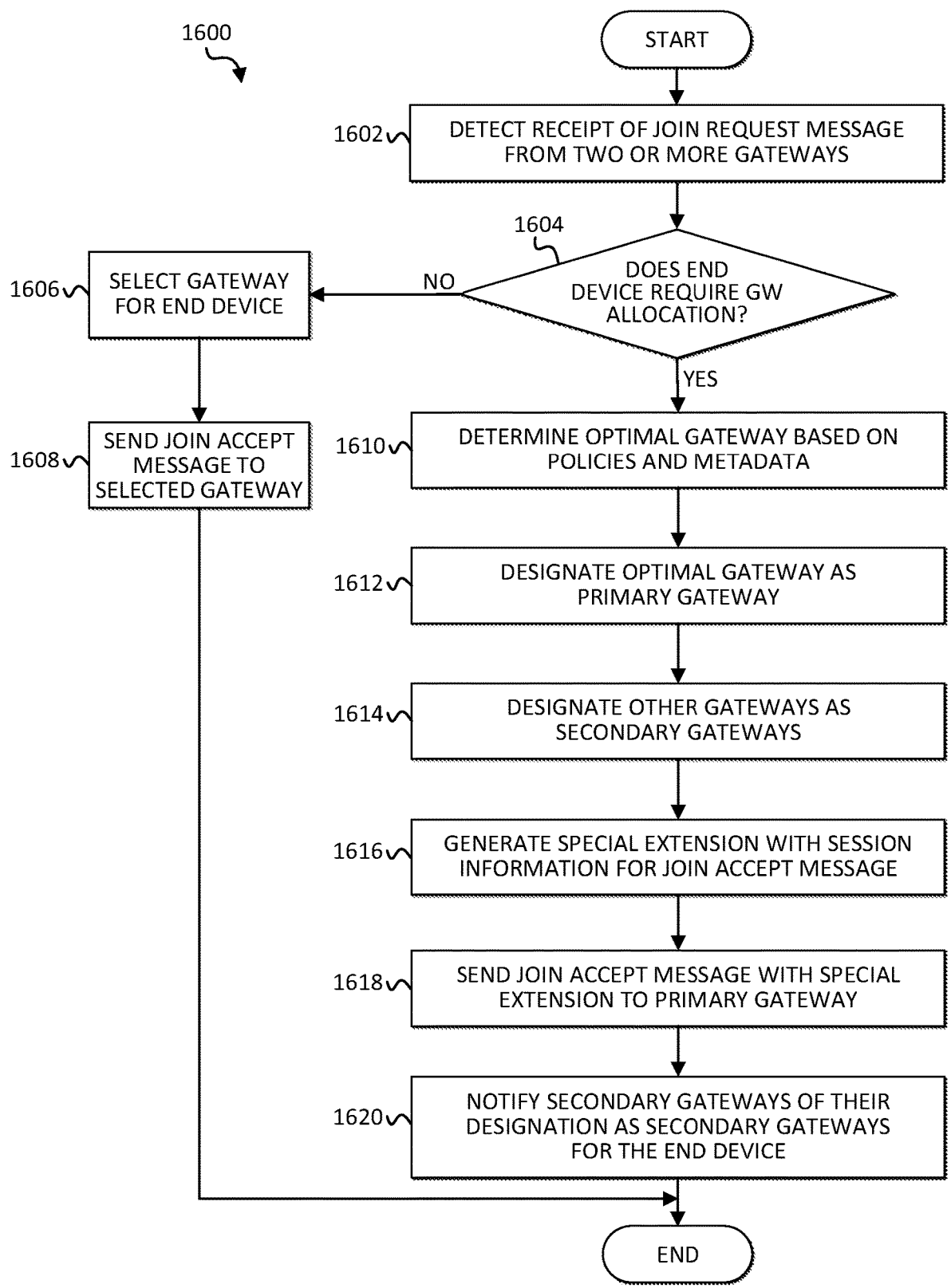
FIG. 16 is a simplified flowchart of potential operations associated with a communication system according to an embodiment of the present disclosure.
Figure 17:
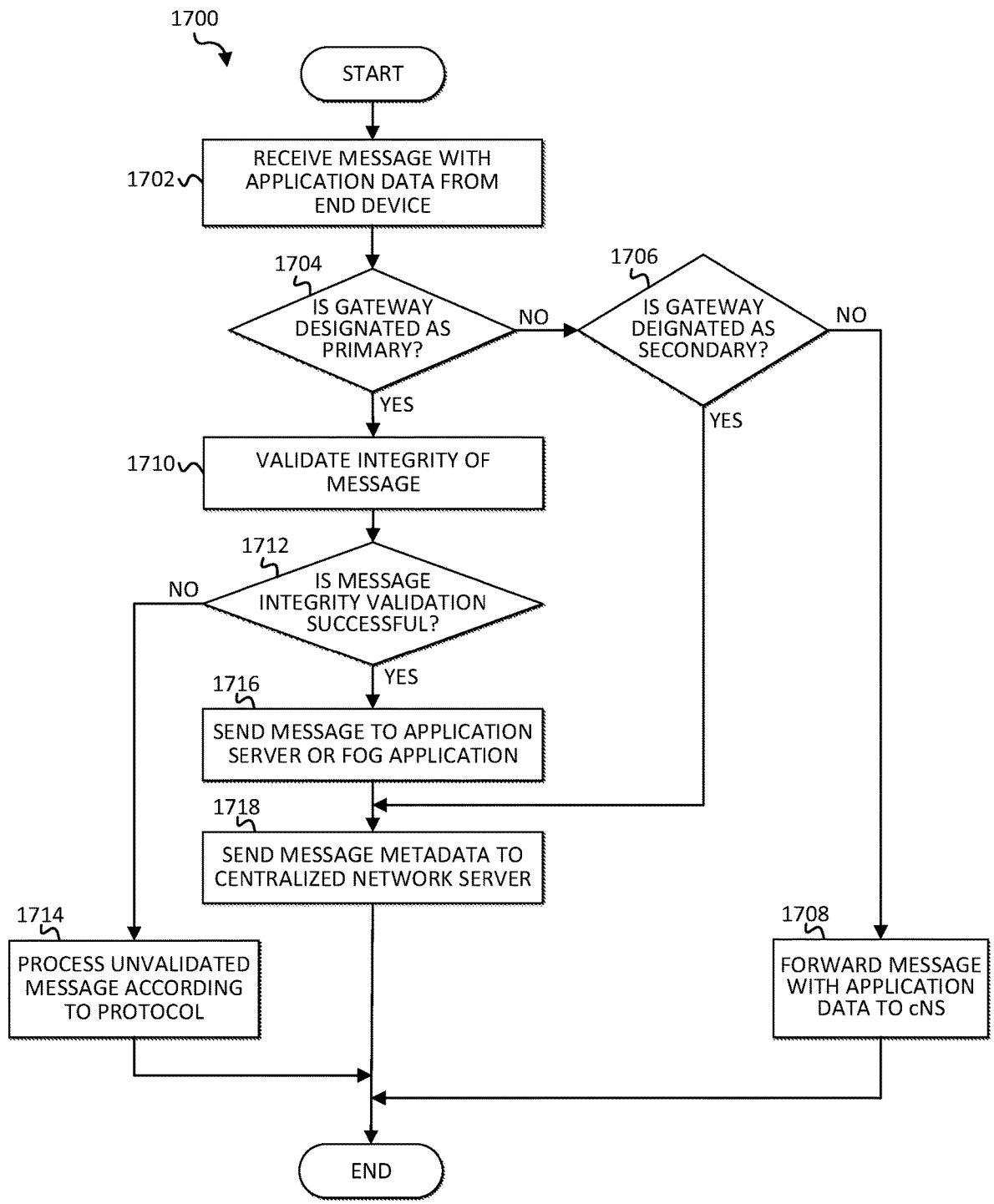
FIG. 17 is a simplified flowchart of potential operations associated with a communication system according to an embodiment of the present disclosure.

Turning to FIGS. 15-17, various flowcharts illustrate possible operations associated with one or more embodiments of communication system 1300. In FIG. 15, a flow 1500 may be associated with one or more sets of operations. A gateway (e.g., 1330) may comprise means such as one or more processors (e.g., 1359) for performing the operations. In one example, at least some operations shown in flow 1500 may be performed by edge processing logic (e.g., 1332).

At 1502, the gateway can detect receipt of a join request message from an end device (e.g., 1320). At 1506, the join request message can be forwarded to a central network server (e.g., cNS 1360). At 1508, the gateway can receive a reply message from the cNS.

At 1510, a determination can be made as to what type of message the gateway has received. If a determination is made that the gateway has received a join accept message with a special extension that includes session information, then at 1516, an indicator can be set to indicate that the gateway is designated by the cNS as the primary gateway for the end device. At 1518, the session information such as network session key (NwkSkey) and device address (DevAddr) of the end device can be provisioned on gateway 1330 to enable a network session to be established between the end device and the gateway. At 1520, the gateway can forward the join accept message to the end device and the session can be established. With reference again to 1510, if a determination is made that the gateway has received a message including a notification that the gateway has been designated as a secondary gateway, then at 1514, an indicator can be set to indicate the gateway is designated by the cNS as a secondary gateway for the end device.

In other scenarios, a join accept message received by the gateway may not include a special extension that includes session information. In this scenario, the gateway is not designated as a primary gateway for processing application data and forwarding it directly to an application server. In this scenario, application data received by the gateway can be forwarded by the gateway to the cNS, which can then forward the data to the appropriate application server.

In FIG. 16, a flow 1600 may be associated with one or more sets of operations. A central network server (e.g., 1360) may comprise means such as one or more processors (e.g., 1369), for performing the operations. In one example, at least some operations shown in flow 1600 may be performed by gateway selection logic (e.g., 1362). In addition, policies (e.g., policy store 1366) and lists (e.g., configuration store 1364) may provide information used by the gateway selection logic.

At 1602, the cNS can detect receipt of a join request message from one or more gateways, where the join request message was generated by an end device (e.g., end device 1320). At 1604, the cNS can determine whether the end device requires gateway allocation to process application data and communicate the application data directly to an application server or fog application. An application server associated with the end device can be identified based, at least in part, on the join request message. For example, an Fport field in the message may contain information identifying an application (e.g., application identifier) associated with the end device. Based on the application identifier, the cNS can then identify an application server that is associated with the application and that can process data generated by the end device.

Configuration store 1364 may indicate which Fport values require gateway allocation for the end device. In at least one embodiment, based on the Fport information and other information contained in configuration store 1364, the cNS can determine whether a gateway is to be allocated for the end device to facilitate communication between the end device and the application server without traversing the cNS. If a gateway is to be allocated for the end device, the cNS can also determine session information including a network session key (NwkSkey) and device address (DevAddr) of the end device.

If a determination is made that a gateway is not to be allocated, then at 1606, a gateway can be selected for the end device according to existing protocols. At 1608, a join accept message can be sent to the selected gateway.

If a determination is made that a gateway is to be allocated for the end device, then at 1610, an optimal gateway for the end device can be determined based on policies and possibly relevant metadata. For example, the policies may indicate that the gateway having the closest proximity to the identified application server is to be selected. In addition, policies associated with one or more other considerations such as end device characteristics, end device data transmission patterns, end device location, latency and end device profile, for example, may also be evaluated when selecting an optimal gateway. At 1612, the selected gateway may be designated as a primary gateway for the end device. At 1614, one or more other overlapping gateways (if any) may be designated as secondary gateways. Overlapping gateways can include any or all other gateways from which the cNS received the same join request from the end device. Designating gateways as primary and secondary can include storing an indication of the designations in the cNS.

At 1616, the cNS can add a special extension with session information to a join accept message to be sent in response to the join request message. In at least one embodiment, the session information can include the network session key (NwkSkey) and the device address (DevAddr). This information indicates that the gateway receiving the message is designated as a primary gateway for the end device and enables a session to be established between the gateway and the end device. At 1618, the join accept message with the session information can be sent to the primary gateway. At 1620, the cNS can notify the other overlapping gateways (if any) of their designation as secondary gateways for the end device.

In FIG. 17, a flow 1700 may be associated with one or more sets of operations. A gateway (e.g., 1330) or network device on which a gateway is provisioned (e.g., 1350) may comprise means such as one or more processors (e.g., 1359), for performing the operations. In one example, at least some operations shown in flow 1700 may be performed by edge processing logic (e.g., 1332). Flow 1700 can be performed after a session is established between an end device (e.g., 1320) and an application server (e.g., 1370) via the gateway. Furthermore, flow 1700 may be repeated for each message received by the gateway from the end device during the session.

At 1702, after a session is established between the end device and the gateway, a message with application data from the end device is received by the gateway. At 1704, the gateway can determine whether it is designated as a primary gateway for the end device to process the end device's application data and facilitate communication with an appropriate application server. In at least one embodiment, this can be determined based on an indicator set by the gateway based on receiving a join accept message that included a special extension with session information from the cNS. If the gateway determines it is designated as a primary gateway for processing the end device's application data, then at 1710, the gateway can attempt to validate the integrity of the message. At 1712, if it is determined that validation was not successful, then at 1714 the unvalidated message may be processed according to appropriate protocol (e.g., message dropped, error message returned to end device, etc.).

If it is determined that the validation of the message integrity was successful at 1712, then at 1716, the gateway can send the message to the appropriate application server or fog application, depending on the implementation. The application server may be identified based, at least in part, on the NwkSkey received from the cNS and provisioned in the gateway. If a fog application is provisioned in the communication system (e.g., 1352), then the fog application can process any uplink data from the end device. At 1718, the gateway can optionally send message metadata to the cNS. Such metadata can include, but is not limited to, a timestamp associated with the receipt of the message, RSSI, SNR, FCnt, and/or device address (DevAddr). In addition, any MAC command received from the end device may also be included with the metadata.

With reference again to 1704, if the gateway determines that it is not designated as a primary gateway for processing certain end device data, then at 1706, the gateway can determine whether it is designated as a secondary gateway. If it is determined that the gateway is designated as a secondary gateway, then the message is not forwarded, but at 1718, message metadata can be forwarded to the cNS, as previously described. If it is determined, at 1706, that the gateway is not designated as a secondary gateway, then a gateway is not allocated to process the end device's application data and at 1708, the message with application data can be forwarded to the cNS and processed normally.

In at least one embodiment, flow 1100 of FIG. 11 can be performed by fog application 1352 in communication system 1300. Similarly, flow 1200 can be performed by cNS 1360 in communication system 1300 to determine whether the primary gateway should be switched due to mobility changes. In communication system 1300, however, when the optimal gateway is determined based on metadata, latency and policies, edge network servers are not considered, as they are not included in communication system 1300.

Variations and Implementations

In certain example implementations, the application based intelligent edge computing capabilities outlined herein may be implemented by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the application based intelligent edge computing capabilities, as outlined herein. Additionally, these network elements may include at least one processor that can execute software, an algorithm, or other instructions to perform the application based intelligent edge computing operations, as disclosed herein. These network elements may further keep information, to be used in achieving the capabilities as discussed herein, in any suitable memory element (ternary content-addressable memory (TCAM), random access memory (RAM), read only memory (ROM), EPROM, EEPROM, ASIC, etc.), software, firmware, hardware, or in any other suitable component, device, element, or object where appropriate and based on particular needs. Any of the memory items discussed herein (e.g., repositories, stores, databases, tables, caches, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that the systems described herein are readily scalable and can accommodate a large number of components, as well as more complicated/sophisticated arrangements and configurations. Accordingly, the examples provided should not limit the scope or inhibit the broad teachings of the communication system as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Note that in this Specification, references to "optimize," "optimization," "optimized", "optimal" and related terms are terms of art that refer to improvements in speed, efficiency, and/or results of a specified outcome or element (e.g., gateway) and do not purport to indicate that a process for achieving the specified outcome or the operations of a specified element has achieved, or is capable of achieving, a perfectly speedy/perfectly efficient state or element. Also, as used herein, items may be 'mapped' to each other by any suitable marking or linking technique (e.g., pointers, indexes, file names, linked lists, file names, relational databases, hash table, bitmap, etc.), or any other technique that represents a relation, connection, association, or link between the 'mapped' items.

It is also important to note that the activities, interactions, and operations shown and described herein illustrate only some of the possible scenarios and patterns that may be executed by, or within, the network elements providing application based intelligent edge computing capabilities. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably.

The preceding operational flows have been offered for purposes of example and discussion. Substantial flexibility is provided by the communication systems (e.g., 100, 300, 1300) in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned in any appropriate manner, and which may be based on particular configuration and/or provisioning needs.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of the communication systems as disclosed herein.

What is claimed is:

1. A method, comprising:
  receiving, at a central network server, two or more requests to join a network from an end device via two or more gateways, respectively;
  selecting one of the two or more gateways for the end device; and
  sending, to the selected gateway, a response to at least one of the two or more requests to join the network received via the selected gateway, wherein the response includes an indication to the selected gateway to forward the at least one of the two or more requests to join the network to an edge network server associated with the selected gateway;
  designating the selected gateway as a primary gateway for the end device;

designating at least one other gateway of the two or more gateways as a secondary gateway for the end device;

receiving, from the secondary gateway, metadata associated with a message received by the secondary gateway from the end device; and evaluating the metadata received from the secondary gateway to determine whether to change designations of primary gateway and secondary gateway for the end device.

2. The method of claim 1, further comprising:

identifying an application based on information included in the at least one of the two or more requests to join the network; and determining whether to allocate the edge network server to the end device based, at least in part, on a type of the identified application.

3. The method of claim 1, wherein the selected gateway is selected based, at least in part, on a policy.

4. The method of claim 3, further comprising:

identifying an application server for receiving data generated by the end device, wherein the policy is related to a proximity of the edge network server to the application server.

5. The method of claim 1, further comprising:

receiving, at the central network server from the primary gateway, metadata associated with a message received by the primary gateway from the end device, wherein the message is not received at the central network server.

6. The method of claim 1, wherein the selected gateway forwards a message from the end device to the edge network server subsequent to receiving the response to the at least one of the two or more requests to join the network.

7. The method of claim 1, further comprising:

generating an extension for the response, the extension to include the indication to send the request to join the network to the edge network server.

8. The method of claim 1, wherein the edge network server is collocated with the selected gateway.

9. At least one non-transitory machine readable storage medium including code for execution that, when executed by at least one processor, causes the at least one processor to perform operations comprising:

receiving, at a central network server, two or more requests to join a network from an end device via two or more gateways, respectively;

selecting one of the two or more gateways for the end device; and sending, to the selected gateway, a response to at least one of the two or more requests to join the network received via the selected gateway, wherein the response includes an indication to the selected gateway to forward the request to join the network to an edge network server associated with the selected gateway;

designating the selected gateway as a primary gateway for the end device;

designating at least one other gateway of the two or more gateways as a secondary gateway for the end device;

receiving, from the secondary gateway, metadata associated with a message received by the secondary gateway from the end device; and evaluating the metadata received from the secondary gateway to determine whether to change designations of primary gateway and secondary gateway for the end device.

10. The at least one machine readable storage medium of claim 9, wherein the operations further comprise:

identifying an application based on information included in the one of the two or more requests to join the network; and determining whether to allocate the edge network server to the end device based, at least in part, on a type of the identified application.

11. The at least one machine readable storage medium of claim 9, wherein the operations further comprise:

identifying an application server for receiving data generated by the end device, wherein the selected gateway is selected based, at least in part, on a proximity of the edge network server to the application server.

12. An apparatus, comprising:

at least one processor;

logic that, when executed by the at least one processor is to:

receive, at a central network server, two or more requests to join a network from an end device via two or more gateways, respectively;

select one of the two or more gateways for the end device; and send, to the selected gateway, a response to at least one of the two or more requests to join the network received via the selected gateway, wherein the response includes an indication to the selected gateway to forward the request to join the network to an edge network server associated with the selected gateway;

designate the selected gateway as a primary gateway for the end device;

designate at least one other gateway of the two or more gateways as a secondary gateway for the end device;

receive, from the secondary gateway, metadata associated with a message received by the secondary gateway from the end device; and evaluate the metadata received from the secondary gateway to determine whether to change designations of primary gateway and secondary gateway for the end device.

13. The apparatus of claim 12, wherein the logic, when executed by the at least one processor is to:

identify an application server for receiving data generated by the end device, wherein the selected gateway is selected based, at least in part, on a policy.

14. A method, comprising:

receiving at a gateway to a network, a message from a central network server to accept a request to join the network from an end device;

determining whether the message includes an extension;

forwarding the request to join the network to an edge network server based on determining the message includes the extension, wherein the edge network server provides a path for application data received from the end device to an application server, wherein the path bypasses the central network server;

receiving a second message from the end device, the second message containing application data generated by the end device; and forwarding the second message to the edge network server, wherein the second message from the end device is forwarded by the edge network server to a fog application collocated on a network device with the edge network server, wherein the fog application performs one or more analytic computations associated with data included in the second message from the end device.

15. The method of claim 14, further comprising:
receiving the request to join the network from the end device;
forwarding the request to join the network to the central network server; and
storing the request to join the network subsequent to receiving the request.

16. The method of claim 14, wherein, prior to forwarding the second message to the edge network server, determining that the gateway is designated as a primary gateway for the end device.

17. The method of claim 14, further comprising:
sending metadata associated with the second message to the central network server without sending the second message to the central network server.

18. The method of claim 14, wherein the edge network server validates an integrity of the second message prior to sending the second message to the application server.

19. The method of claim 14, wherein the second message from the end device is forwarded by the edge network server to the application server associated with the end device.

* * * * *